US012690033B2

(12) United States Patent
Ramamurthy et al.

(10) Patent No.: US 12,690,033 B2
(45) Date of Patent: Jul. 21, 2026

(54) METHODS AND SYSTEMS FOR REVIVING SCHEDULING REQUEST (SR) RESOURCES

(71) Applicant: Samsung Electronics Co., Ltd., Suwon-si (KR)

(72) Inventors: Arvind Ramamurthy, Bangalore (IN); Abhishek Chaturvedi, Bangalore (IN); Dibyajyoti Pati, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 436 days.

(21) Appl. No.: 18/461,012

(22) Filed: Sep. 5, 2023

(65) Prior Publication Data

US 2023/0413265 A1      Dec. 21, 2023

Related U.S. Application Data

(63) Continuation of application No. PCT/KR2022/004484, filed on Mar. 30, 2022.

(30) Foreign Application Priority Data

Mar. 31, 2021      (IN) .............................. 202141015393
Sep. 29, 2021      (IN) ........................... 2021 41015393

(51) Int. Cl.
*H04W 72/1268*       (2023.01)
*H04W 72/21*       (2023.01)
*H04W 74/0833*       (2024.01)

(52) U.S. Cl.
CPC ....... *H04W 72/1268* (2013.01); *H04W 72/21* (2023.01); *H04W 74/0833* (2013.01)

(58) Field of Classification Search
CPC ............. H04W 72/1268; H04W 72/21; H04W 74/0833; H04W 76/19; H04L 5/0098; H04L 5/001
See application file for complete search history.

(56) References Cited

U.S. PATENT DOCUMENTS

2015/0036476 A1* 2/2015 Vos ....................... H04L 1/1887
                                                                    370/216
2016/0295442 A1   10/2016 Mrtej et al.
                        (Continued)

FOREIGN PATENT DOCUMENTS

WO          2019/006945 A1      1/2019

OTHER PUBLICATIONS

LG Electronics, Discussion on latency and efficiency enhancement for NR positioning, 3GPP TSG RAN WG1 #104-e, R1-2100711, e-Meeting, Jan. 25-Feb. 5, 2021.
                        (Continued)

*Primary Examiner* — Christine Ng
(74) *Attorney, Agent, or Firm* — Jefferson IP Law, LLP

(57)          ABSTRACT

The disclosure relates to a fifth generation (5G) or sixth generation (6G) communication system. A method performed by a user equipment (UE) in a wireless communication is provided. The method includes requesting a network on a first frequency for allocating an uplink (UL) grant, detecting at least one UL grant failure in which the UE lost scheduling request (SR) resources without receiving the UL grant from network, releasing the first frequency upon detecting the at least one UL grant failure by reporting the at least one UL grant failure to the network, receiving a radio resource control (RRC) reconfiguration including a second frequency from the network in response to reporting the failure and adding the second frequency to revive lost SR resources, the second frequency including the same first frequency, which has been released, or a different secondary primary cell (SPcell) associated with the first frequency.

18 Claims, 11 Drawing Sheets

(56) References Cited

U.S. PATENT DOCUMENTS

| | | | | |
|---|---|---|---|---|
| 2018/0199354 A1* | 7/2018 | Yi | ........................ | H04W 28/02 |
| 2018/0368172 A1* | 12/2018 | Li | ........................ | H04W 72/23 |
| 2019/0021103 A1 | 1/2019 | Zhang et al. | | |
| 2019/0174490 A1 | 6/2019 | Dinan | | |
| 2019/0387577 A1* | 12/2019 | Parron | ................ | H04L 47/2466 |
| 2019/0387578 A1* | 12/2019 | Shrestha | .............. | H04W 72/21 |
| 2020/0221306 A1* | 7/2020 | Chen | .................... | H04W 16/14 |
| 2020/0359441 A1 | 11/2020 | Yilmaz et al. | | |
| 2020/0404693 A1 | 12/2020 | Zhou et al. | | |
| 2021/0029724 A1 | 1/2021 | Tsai et al. | | |
| 2021/0329690 A1* | 10/2021 | Tokgoz | ................ | H04W 72/23 |
| 2022/0264577 A1* | 8/2022 | Bai | ........................ | H04W 72/53 |
| 2023/0422294 A1* | 12/2023 | Lin | ................... | H04W 74/0833 |

OTHER PUBLICATIONS

Indian Office Action dated Nov. 21, 2022, issued in Indian Application No. 202141015393.

International Search report and written opinion dated Jun. 30, 2022, issued in International Application No. PCT/KR2022/004484.

Extended European Search report dated Jul. 8, 2024, issued in European Application No. 22781597.4-1215.

* cited by examiner

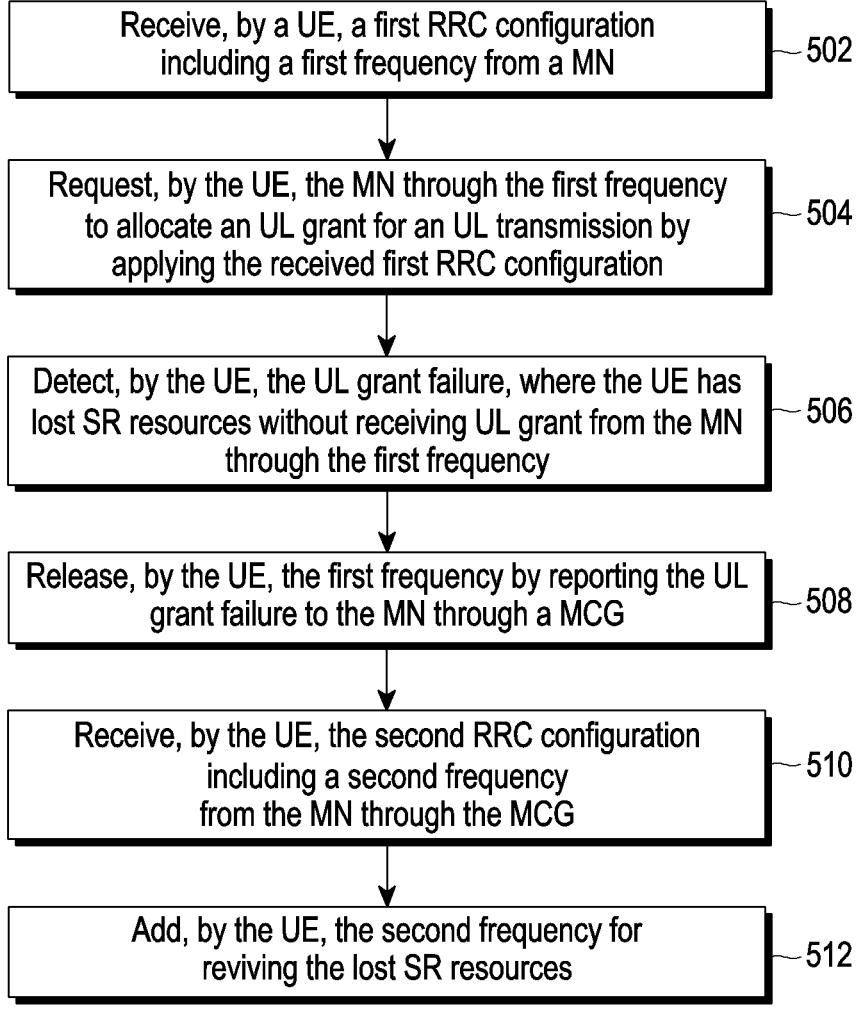

Receive, by a UE, a first RRC configuration including a first frequency from a MN ⟋502

Request, by the UE, the MN through the first frequency to allocate an UL grant for an UL transmission by applying the received first RRC configuration ⟋504

Detect, by the UE, the UL grant failure, where the UE has lost SR resources without receiving UL grant from the MN through the first frequency ⟋506

Release, by the UE, the first frequency by reporting the UL grant failure to the MN through a MCG ⟋508

Receive, by the UE, the second RRC configuration including a second frequency from the MN through the MCG ⟋510

Add, by the UE, the second frequency for reviving the lost SR resources ⟋512

FIG. 5

| Location | GPS/cellular triangulation based |
|---|---|
| Cell ID | via UE protocol stack signaling log |
| Day | UE data/time settings (weekday, weekend) |
| Time | UE data/time settings |
| Typical recovery time | Need to record - number of actual max SR failures after which NW generally starts allocation UL grants, from UE protocol stack internal logging |

FIG. 11

METHODS AND SYSTEMS FOR REVIVING SCHEDULING REQUEST (SR) RESOURCES

CROSS-REFERENCE TO RELATED APPLICATION(S)

This application is a continuation application, claiming priority under §365(c), of an International application No. PCT/KR2022/004484, filed on Mar. 30, 2022, which is based on and claims the benefit of an Indian patent application number 202141015393, filed on Mar. 31, 2021, in the Indian Intellectual Property Office, and of an Indian patent application number 202141015393, filed on Sep. 29, 2021, in the Indian Intellectual Property Office, the disclosure of each of which is incorporated by reference herein in its entirety.

BACKGROUND

1. Field

The disclosure relates to the field of wireless communication systems. More particularly, the disclosure relates to managing Scheduling Request (SR) resources in a wireless communication system.

2. Description of Related Art

Fifth generation (5G) mobile communication technologies define broad frequency bands such that high transmission rates and new services are possible, and can be implemented not only in "Sub 6 gigahertz (GHz)" bands such as 3.5 GHz, but also in "Above 6 GHz" bands referred to as millimeter wave (mmWave) including 28 GHz and 39 GHz. In addition, it has been considered to implement sixth generation (6G) mobile communication technologies (referred to as Beyond 5G systems) in terahertz (THz) bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive multiple-input multiple-output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 preprocessing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, new radio (NR) user equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step random access channel (RACH) for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional (FD) MIMO (FD-MIMO), array antennas and large-scale antennas, metamaterial-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and Artificial Intelligence (AI) from the design stage and internalizing end-to-end AI support functions, and next-generation distributed computing technology for implementing services at levels of complexity exceeding the limit of UE operation capability by utilizing ultra-high-performance communication and computing resources.

In a wireless communication system, a User Equipment (UE) triggers a Scheduling Request (SR) procedure to request a network to allocate uplink (UL) resources (e.g., physical uplink shared channel (PUSCH)/UL grant) for an UL transmission. In accordance with the SR procedure, the UE sends one or more SR messages to the network over Physical Uplink Control Channel (PUCCH) resources (hereinafter may be referred as SR resources), which have been pre-configured via Radio Resource Control (RRC) configuration messages. In response to the one or more SR messages, the network may allocate the UE with the UL resources. However, the one or more SR messages may not reach the network sometimes, due to at least one of, bad radio conditions, dynamic power sharing, and so on.

FIGS. 1A and 1B are example diagrams depicting a method of performing an SR procedure with increased power consumption and unnecessary signaling overload according to the related art.

Whenever the UE wants to transmit data to the network (i.e., the UL transmission), the UE ensures that no other SR procedure is in progress. On ensuring that no other SR procedure is in progress, the UE triggers a "SR counter," which has been initialized to '0'. On triggering the "SR counter," the UE checks if the PUCCH resources are available. If the PUCCH resources are not available, the UE initiates a Random Access Channel (RACH) to receive the UL grant from the network to transmit the data to the network.

If the PUCCH resources are available, the UE recursively performs operations of:
  sending the SR message to the network;
  checking if the value of the "SR counter" has reached a pre-defined maximum value (sr-TransMax), which has been defined in 3rd Generation Partnership Project (3GPP) specification (38.321-f80; 5.4.4); and
  incrementing the value of the "SR counter" to '1', if the value of the SR counter has not reached the pre-defined maximum value, until receiving the UL grant from the network or determining an SR failure. The SR failure corresponds to a condition, where the value of the SR counter has reached the pre-defined maximum value without receiving the UL grant from the network. On determining the SR failure, the UE releases the PUCCH/SR resources, and clears configured downlink (DL) and UL grant. Once the UE releases the SR/PUCCH resources, the UE may not be able to the send the SR messages to the network, whenever the UE wishes to send the SR messages to the network.

On releasing the SR/PUCCH resources, the UE initiates the RACH procedure to receive the UL grant from the network. The UE may perform the RACH procedure recursively, until receiving the UL grant from the network. The UE may receive the UL grant from the network, after performing the RACH procedure for one or multiple times. However, the received UL grant may be a small UL grant over which the UE has to send a Buffer Status Report (BSR) to the network. The BSR may be used as long as a UL data session is active. Once the UL data session ends and UL buffers are empty, the UE may not be able to send the BSR to the network, so a process of allocating the PUSCH for the UE may be terminated. On initiating a new UL data session, the UE may not be able to send the SR messages to the network. Therefore, the UE has to perform the RACH procedure for the UL resources.

Thus, in the related art method, recursively performing the RACH procedures on determining the SR failure, results in unnecessary signaling overload and increased power consumption, which further impacts data throughput performance of the UE by adding additional delays.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide methods and systems for reviving Scheduling Request (SR) resources.

Another aspect of the disclosure is to provide methods and systems for requesting a network on a first frequency in a Dual Connectivity (DC) mode for allocating an Uplink (UL) grant and detecting at least one UL grant failure, wherein the UE has lost the SR resources without receiving the UL grant from the network, wherein the first frequency is a primary carrier or a secondary carrier in the DC, wherein the at least one UL grant failure includes at least one of, a failure of an SR procedure, the failure of the SR procedure with a failure of a follow-up Random Access Channel (RACH) procedure, the failure of the SR procedure with no Physical Uplink Control Channel (PUCCH) configurations, the failure of the SR procedure with a PUCCH UL channel issue, and the failure of the SR procedure with a resource congestion.

Another aspect of the disclosure is to provide methods and systems for releasing the first frequency on detecting the at least one UL grant failure and receiving a second frequency from the network by reporting the at least one UL grant failure to the network.

Another aspect of the disclosure is to provide methods and systems for adding the second frequency to revive the lost SR resources, wherein the second frequency includes the same first frequency, which has been released or a different secondary primary cell associated with the first frequency.

Additional aspects will be set forth in part in the description which follows and, in part, will be apparent from the description, or may be learned by practice of the presented embodiments.

In accordance with an aspect of the disclosure, a method performed by a user equipment (UE) in a wireless communication system is provided. The method includes receiving, from a first base station (BS), a first radio resource control (RRC) configuration including a first frequency, requesting the first BS on the first frequency to allocate an uplink (UL) grant for an UL transmission by applying the first RRC configuration, detecting at least one UL grant failure in which the UE lost scheduling request (SR) resources and did not receive the UL grant from the first BS on the first frequency, releasing the first frequency by reporting the at least one UL grant failure to a second BS, in response to the reporting of the at least one UL grant failure, receiving, from the second BS, a second RRC configuration including a second frequency, and adding the second frequency for reviving the lost SR resources.

In accordance with another aspect of the disclosure, a method performed by a user equipment (UE) in a wireless communication system is provided. The method includes receiving, from a network, a first radio resource control (RRC) configuration including a first frequency, sending one or more scheduling request (SR) messages to the network by applying the first RRC configuration, detecting a failure in the sending of the one or more SR messages to the network, sending a message to the network, the message indicating the failure in the sending of the one or more SR messages, and in response to sending the message, receiving, from the network, a second RRC configuration including a second frequency.

In accordance with another aspect of the disclosure, a UE in a wireless communication system is provided. The UE includes a transceiver, a memory, and a controller coupled to the memory and the transceiver. The controller is configured to receive, from a first base station (BS), a first radio resource control (RRC) configuration including a first frequency, request the first BS on the first frequency to allocate an uplink (UL) grant for an UL transmission by applying the first RRC configuration, detect at least one UL grant failure in which the UE lost scheduling request (SR) resources and did not receive the UL grant from the first BS on the first frequency, release the first frequency by reporting the at least one UL grant failure to a second BS, in response to the reporting of the at least one UL grant failure, receive, from the second BS, a second RRC configuration including a second frequency, and add the second frequency for reviving the lost SR resources.

In accordance with another aspect of the disclosure, a UE in a wireless communication system is provided. The UE includes a transceiver, a memory, and a controller coupled to the memory and the transceiver. The controller is configured to receive, from a network, a first radio resource control (RRC) configuration including a first frequency, send one or more scheduling request (SR) messages to the network by applying the first RRC configuration, detect a failure in the sending of the one or more SR messages to the network, send a message to the network, the message indicating the failure in the sending of the one or more SR messages, and in response to sending the message, receive, from the network, a second RRC configuration including a second frequency.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 is a flow diagram depicting a method for reviving SR resources, according to an embodiment of the disclosure;

FIG. 11 depicts an example training dataset used to train a learning-based cell database, according to an embodiment of the disclosure.

Throughout the drawings, it should be noted that like reference numbers are used to depict the same or similar elements, features, and structures.

DETAILED DESCRIPTION

Figure 1A:
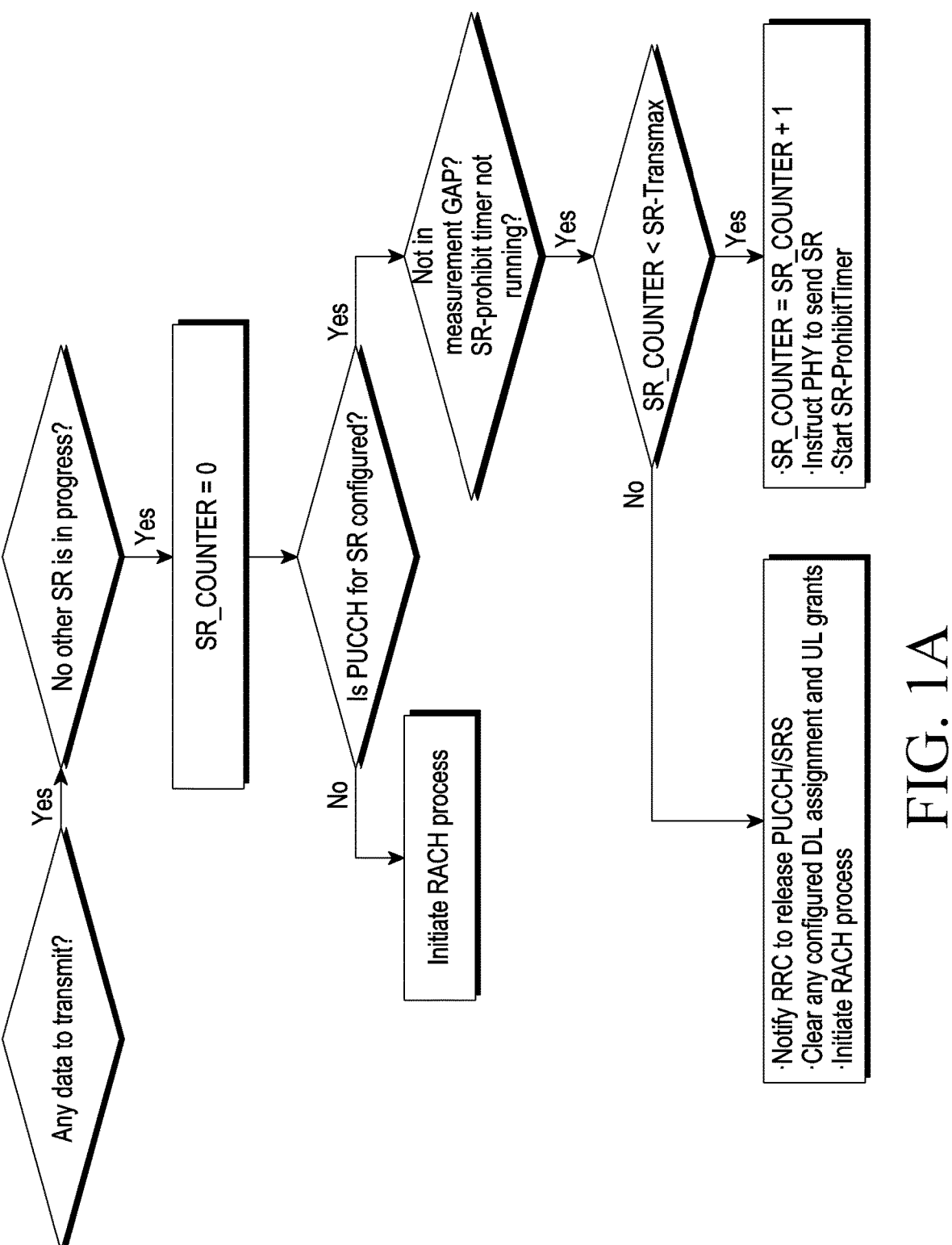
FIGS. 1A and 1B are example diagrams depicting a method of performing a Scheduling Request (SR) procedure with increased power consumption and unnecessary signaling overload, according to the related art.
Figure 1B:
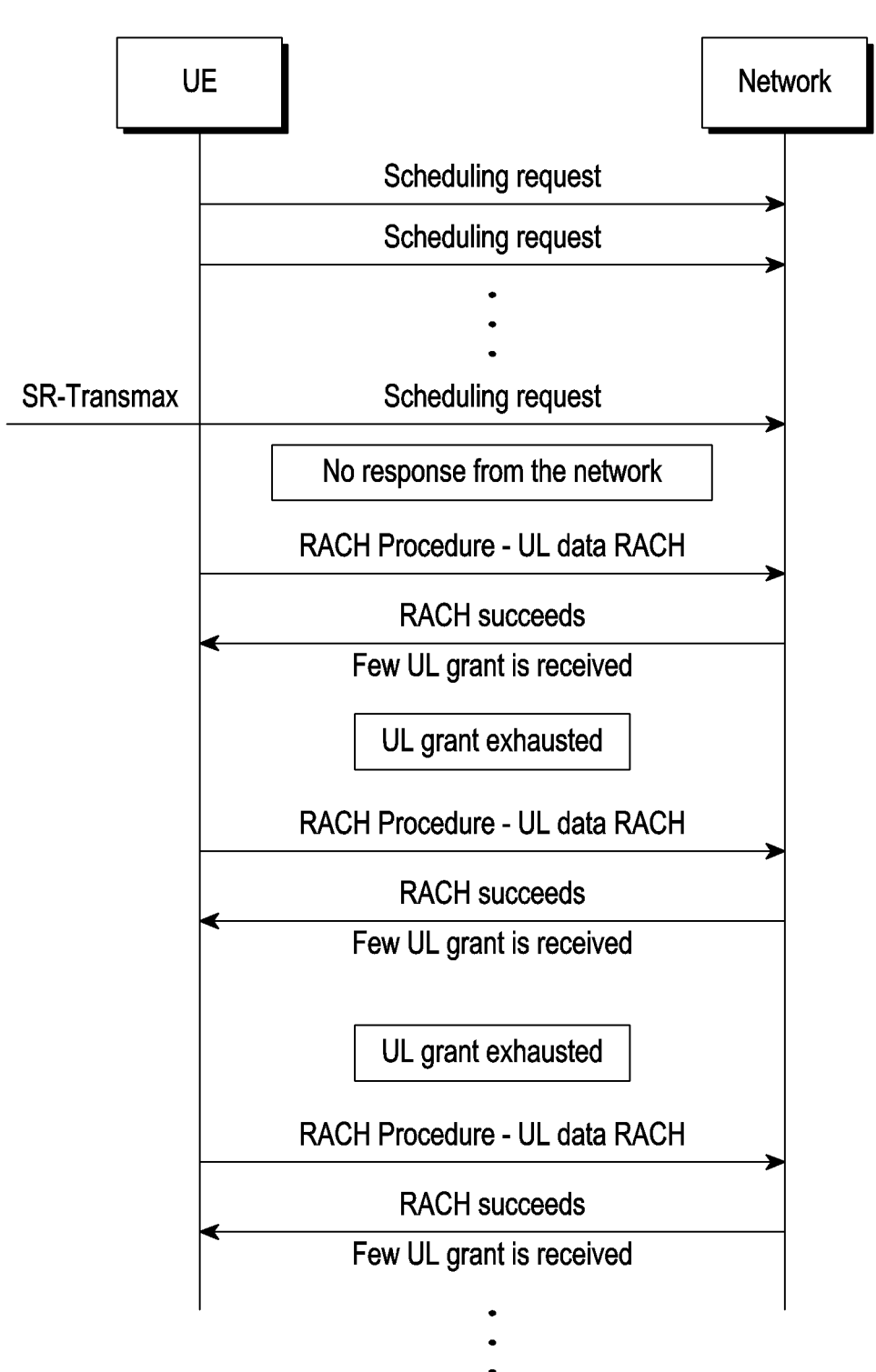

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Embodiments herein disclose methods and systems for reviving Scheduling Request (SR) resources, which have been lost due to at least one uplink (UL) grant failure. Referring now to the drawings, and more particularly to FIGS. 2 to 12, where similar reference characters denote corresponding features consistently throughout the figures, there are shown example embodiments.

Embodiments herein use the terms such as, "Base Station (BS)," "node," "network," "terminal," and so on, interchangeably through the document.

Embodiments herein use the terms such as "frequency," "carrier frequency," "carrier," "cell group," and so on, interchangeably to refer to a bearer associated with at least one BS of a Radio Access Network (RAN).

Embodiments herein use the terms such as, "primary carrier," "primary frequency," "Master Cell Group (MCG),"

and so on, interchangeably to refer to a bearer/resource associated with the BS, which acts as a Master Node (MN).

Embodiments herein use the terms such as "secondary carrier," "secondary frequency," "first frequency," "second frequency," "Secondary Cell Group (SCG)," and so on, interchangeably to refer to a bearer/resource associated with the BS, which acts as a secondary node (SN).

Embodiments herein use the terms "UL resources," "UL grant," "PUCSH," and so on, interchangeably to refer to resources required for an Uplink (UL) transmission.

Embodiments herein use the terms "PUCCH resources," "SR resources," and so on, interchangeably to refer to resources required for sending the one or more Scheduling Request (SR) messages to the BS.

Embodiments herein use the terms "UL grant failure," "SR failure," and so on, interchangeably to refer to a condition/scenario, where a User Equipment (UE) has lost the SR resources without receiving the UL grant from the BS.

Embodiments herein use the terms such as "expected duration," "recovery time," "UL grant allocate duration," and so on, interchangeably to refer to a duration with which the UE may be allocated with the UL grant from the BS.

In an embodiment, a first BS may be referred to either the MN or the SN, through the document.

In an embodiment, a second BS may be referred to the MN, through the document.

Figure 2:
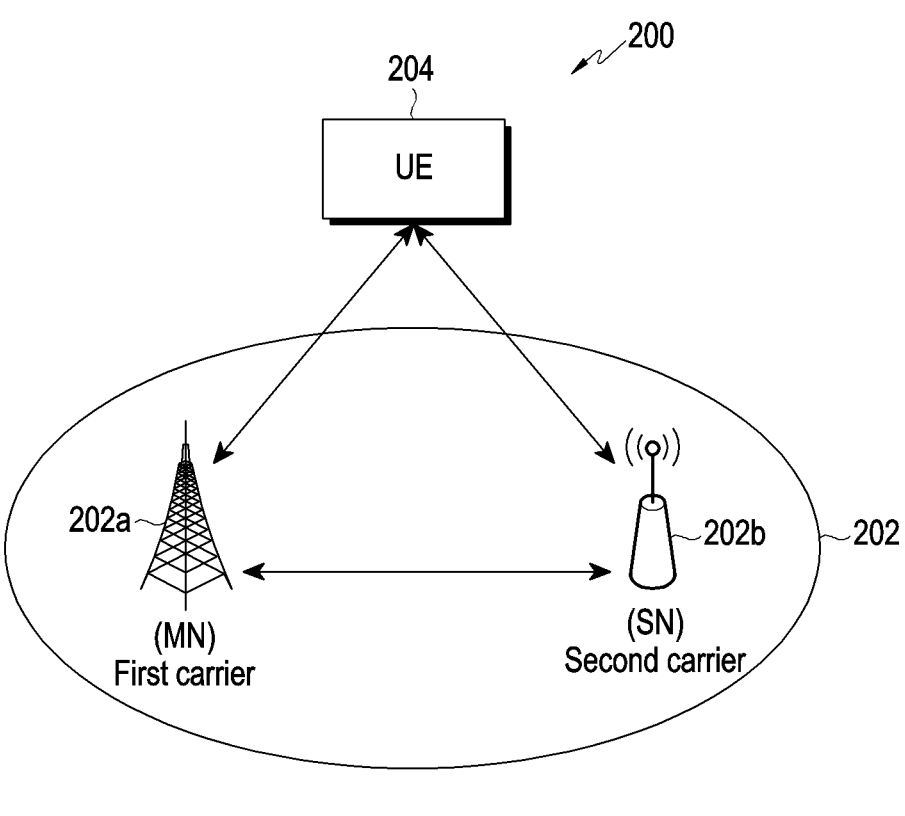
FIG. 2 depicts a wireless communication system, according to an embodiment of the disclosure.

FIG. 2 depicts a wireless communication system, according to an embodiment of the disclosure. A wireless communication system (e.g., wireless communication system 200 of FIG. 2) referred herein supports different modes of Dual Connectivity (DC) across different Radio Access Technologies (RATs). Examples of the RATs may be, but are not limited to, a $3^{rd}$ Generation Partnership Project (3GPP), a Long Term Evolution (LTE/fourth generation (4G)), an LTE-Advanced (LTE-A), a Fifth Generation (5G) New Radio (NR), a Wireless Local Area Network (WLAN), Code Division Multiple Access (CDMA), Frequency Division Multiple Access (FDMA), Time Division Multiple Access (TDMA), Orthogonal Frequency Division Multiple Access (OFDMA), General packet radio service (GPRS), Enhanced Data rates for GSM Evolution (EDGE), Universal Mobile Telecommunications System (UMTS), Enhanced Voice-Data Optimized (EVDO), High Speed Packet Access (HSPA), HSPA plus (HSPA+), Wireless Local Area Network (WLAN), Worldwide Interoperability for Microwave Access (WiMAX/IEEE 802.16), wireless fidelity (Wi-Fi) (e.g., IEEE 802.11), Evolved-UTRA (E-UTRA), Wi-Fi Direct, or any other next generation network. In an example, the wireless communication system supports an LTE DC (i.e., the DC is between LTE eNodeBs (eNBs)). In another example, the wireless communication system supports an E-UTRAN (Evolved UMTS Terrestrial Radio Access Network) New Radio—Dual Connectivity (EN DC) (i.e., the DC is between an LTE eNB and a 5G gNodeB (gNB)). In another example, the wireless communication system supports a Multi-RAT DC (MR DC) (i.e., the DC is between different RATs).

Referring to FIG. 2, a wireless communication system 200 includes a Radio Access Network (RAN) 202, and one or more User Equipments (UEs) 204.

The RAN 202 referred herein may include a plurality of Base Stations (BSs)/nodes of different RATs supporting the DC. Examples of the nodes may be, but are not limited to, eNodeBs (eNBs), gNodeBs (gNBs), and so on. The BS/node may connect the one or more UEs 204 to a core network (CN) (not shown) for communication services. Examples of the communication services may be, but are not limited to, a streaming service (streaming of multimedia data such as audio, video, text and so on), a call related service, a file download service, a carousel service (combining file download service and streaming service), a television (TV) service, a media on demand service, and so on. The BSs/nodes may be at least one of, but is not limited to, macro cells, small cells, pico cells, and so on.

To achieve the DC, the RAN 202 may support a bearer split functionality, which enables the RAN 202 to split a bearer over multiple BSs/nodes (for example; a master node (MN) 202a and a secondary node (SN) 202b). The MN 202a may be the BS/node associated with the macro cell, which provides radio resources to the UE 204 by acting as a mobility anchor towards the CN. The SN 202b may be the BS/node associated with the small cell/pico cell, which provides additional radio resources to the UE 204. The MN 202a and the SN 202b may be connected with each other over an interface. In an example, the MN 202a and the SN 202b may be connected over an X2 interface. The MN 202a and the SN 202b may be associated with serving cells/carrier frequencies such as a primary carrier/Master Cell Group (MCG) and a secondary carrier/Secondary Cell Group (SCG), respectively. The MCG and the SCG may be a group of cells associated with the MN 202a and the SN 202b, respectively comprising a primary cell (PCell)/primary SCell (PSCell) and optionally one or more Secondary Cells (SCells). The MN 202a may be configured to add or release the SCGs associated with the SN 202b.

The UE 204 referred herein may be any device that supports the DC across the different RATs. Examples of the UE 204 may be, but are not limited to, a mobile phone, a smartphone, tablet, a phablet, a personal digital assistant (PDA), a laptop, a computer, a wearable computing device, a vehicle infotainment device, an Internet of Things (IoT) device, a Wi-Fi router, or any other device that supports the DC.

The DC enables the UE 204 to consume radio resources provided by at least two different BSs of the RAN 202. In an example herein, consider that the UE 204 consumes the radio resources provided by the BS or MN 202a and the BS or SN 202b, wherein the BS acts as the MN 202a and the BS 202b acts as the SN 202b. In the DC, the UE 204 may be configured with multiple cells, one per serving frequency, while the serving cells may be connected to more than one BS (i.e., Carrier Aggregation (CA)). In an example herein, the UE 204 may be configured with the MCG and the SCG through the MN 202a and the SN 202b, respectively.

The UE 204 receives a first Radio Resource Control (RRC) configuration including a first frequency from a first BS. In an embodiment, the first BS may be the MN 202a or the SN 202b. The first RRC may be defined in accordance with 3GPP specification 36. 331 Release 15 and/or 3GPP specification 38.331. The first frequency indicates configurations of the SCG associated with the first BS (202a, 202b). The UE 204 adds the SCG according to the 3GPP specification, which provides the additional resources to the UE 204.

Whenever the UE 204 wants to perform an Uplink (UL) transmission, the UE 204 initiates a Scheduling Request (SR) with the first BS (202a, 202b) to receive UL resources/UL grant for the UL transmission. The UE 204 may perform the SR procedure by applying the first RRC configuration that includes the first frequency (i.e., the UE 204 may perform the SR procedure with the first BS (202a, 202b) through the SCG). The UL transmission involves transmission of data to at least one external entity. Examples of the data may be, but are not limited to, audio, video, files, and so on. In an example, the UL resources/UL grant may include physical uplink shared channel (PUSCH).

The UE 204 may perform the SR procedure, in accordance with 3GPP specification 38.321-f80; 5.4.4 with the first BS (202a, 202b), by applying the first RRC configuration. The SR procedure involves requesting the first BS (202a, 202b) to allocate the UL resources for the UL transmission by sending one or more SR messages to the first BS (202a, 202b) through the SCG/first frequency. The UE 204 may send the one or more SR messages to the first BS (202a, 202b) over Physical Uplink Control Channel (PUCCH) resources/SR resources provided by the SCG/first frequency.

In response to the performed SR procedure, the UE 204 may receive the UL grant from the first BS (202a, 202b) through the SCG/first frequency. In such a scenario, the UE 204 uses the received UL grant to perform the UL transmission.

Alternatively, the UE 204 may detect an UL grant failure/ SR failure, while performing the SR procedure. The UL grant failure may depict a condition wherein the UE 204 has lost the SR resources and not received the UL grant from the first BS (202a, 202b) through the SCG. Examples of the UL grant failure may be, but are not limited to, a failure in sending the one or more SR messages to the first BS (202a, 202b) (hereinafter referred as a failure of the SR procedure), the failure of the SR procedure and a failure of a follow-up Random Access Channel (RACH) procedure, the failure of the SR procedure with no Physical Uplink Control Channel (PUCCH) configurations, the failure of the SR procedure with a PUCCH UL channel issue, and the failure of the SR procedure with a resource congestion issue.

Embodiments herein explain the detection of the failure of the SR procedure by the UE 204.

On triggering the SR procedure, the UE 204 triggers a "SR counter", which has been initialized to '0'. The UE 204 uses the SR counter to track a number of transmissions of the SR messages to the first BS (202a, 202b). On triggering the "SR counter", the UE 204 recursively performs operations of: sending the SR message to the first BS (202a, 202b) through the SCG, checking if the value of the "SR counter" has reached an SR transmission maximum threshold (sr-TransMax), and incrementing the value of the SR counter to '1', if the value of the SR counter has not reached the pre-defined maximum value, until receiving the UL resources from the first BS (202a, 202b) or the value of the SR counter reaches the SR transmission maximum threshold without receiving the UL resources from the first BS (202a, 202b). The SR transmission maximum threshold may be defined according to the 3GPP specification (38.321-f80; 5.4.4). The UE 204 detects the failure of the SR procedure, when the value of the SR counter (i.e., the number of transmissions of the SR messages) reaches the SR transmission maximum threshold without receiving the UL resources from the first BS (202a, 202b). The failure of the SR procedure depicts that the UE 204 has lost the SR resources, so that the UE 204 may not be able to send the one or more SR messages to the first BS (202a, 202b) through the SCG.

Embodiments herein explain the detection of the failure of the SR procedure and the failure of the follow-up RACH procedure.

The UE 204 detects the failure of the SR procedure, when the number of transmissions of the SR messages to the first BS (202a, 202b) reaches the SR transmission maximum threshold without receiving the UL resources from the first BS (202a, 202b). On detecting the failure of the SR procedure, the UE 204 initiates the follow-up RACH procedure with the first BS (202a, 202b) and recursively performs the RACH procedure for a defined number of RACH attempts, on detecting the failure of the SR procedure. The UE 204 may perform the RACH procedure according to with 3GPP specification 36. 331 Release 15 and/or 3GPP specification 38.331. In an embodiment, the number of RACH attempts may be defined and varied by network operators (who provides the communication services of the one or more RATs to the UE 204/users of the UE 204). In another embodiment, the number of RACH attempts may be pre-defined on the UE 204. For example, the number of RACH attempts may be defined as 5 RACH attempts within 1 second, so that the UE 204 performs the RACH procedure for 5 times within 1 second.

The UE 204 checks if the UE 204 has received the UL grant after performing the follow-up RACH procedure for the pre-defined number of RACH attempts. The UE 204 detects the failure of the SR procedure and the follow-up procedure RACH procedure, if the UE has not received the UL grant after performing the follow-up RACH procedure for the pre-defined number of RACH attempts.

Embodiments herein explain the detection of the failure of the SR procedure with no PUCCH configurations.

The UE 204 detects the failure of the SR procedure, when the number of transmissions of the SR messages to the first BS (202a, 202b) through the SCG reaches the SR transmission maximum threshold without receiving the UL resources from the first BS (202a, 202b). On detecting the failure of the SR procedure, the UE 204 initiates the follow-up RACH procedure and performs the RACH procedure with the first BS (202a, 202b) to receive the UL resources from the first BS (202a, 202b). The UE 204 performs the RACH procedure according to 3GPP specification 36.331 Release 15 or 3GPP specification 38.331. If the follow-up RACH procedure is successful, the UE 204 checks if the UE 204 has received PUCCH configurations from the first BS (202a, 202b) through the SCG in a RRC reconfiguration or via Downlink Control Information (DCI). If the UE 204 has not received the PUCCH configurations, the UE 204 does not sustain the SCG, as the UE 204 may not be able to send a required important signaling to the first BS (202a, 202b) through the SCG. Examples of the signaling may be, a UL control signaling, SR messages, Channel State Information, Hybrid Automatic Repeat Request (HARQ) feedback (for received downlink packets), and so on. Thus, the UE 204 releases the existing PUCCH configurations of the SCG. Further, the UE 204 may identity a new trigger for the SR procedure, when the data arrives in a L2 buffer (i.e., a segment/part of a memory 302 of the UE 204) for the UL transmission. In such a scenario, the UE 204 detects the failure of the SR procedure with no PUCCH configurations, as the UE does not have the PUCCH configurations to send the SR messages to the first BS (202a, 202b) through the SCG for the UL resources.

Embodiments herein explain the detection of the failure of the SR procedure with the PUCCH UL channel issue.

On triggering the SR procedure to receive the UL grant, the UE 204 sends the SR message with HARQ acknowledgment (ACK) to the first BS (202a, 202b) through the SCG over the PUCCH recursively, until the UL resources are received or the number of transmissions of the SR message reaches the SR transmission maximum threshold (i.e., the value of the "SR counter" reaching the SR transmission maximum threshold). The UE 204 may send the HARQ ACK to the first BS (202a, 202b) for acknowledging reception of at least one previous Physical Downlink Shared Channel (PDSCH) packet. The UE 204 determines the failure of the SR procedure for the UL grant request, if the number of transmissions of the SR messages with the HARQ ACK reaches the SR transmission maximum threshold.

On detecting the failure of the SR procedure for the UL grant request, the UE 204 initiates the follow-up RACH procedure to receive the UL grant. In response to the initiated follow-up RACH procedure, the UE 204 may receive the at least one PDSCH packet from the first BS (202a, 202b) through the SCG. The received at least one PDSCH packet may be the at least one PDSCH packet that has been previously transmitted to the UE 204. The UE 204 determines reception/retransmission of the at least one PDSCH packet from the first BS (202a, 202b) through the SCG as the PUCCH UL channel issue. The PUCCH UL channel issue depicts that the PUCCH UL channel is in bad condition, as the first BS (202a, 202b) has re-transmitted the previous at least one PDSCH packet or a corrupted PDSCH packet to the UE 204 by misinterpreting the HARQ ACK as a negative acknowledgment (NACK). The UE 204 further detects the failure of the SR procedure with the PUCCH UL channel issue, on determining the failure of SR procedure for the UL grant requests and the PUCCH UL channel issue. The UE 204 also aborts the follow-up RACH procedure, if the follow-up RACH procedure is ongoing, on detecting the failure of the SR procedure with the PUCCH UL channel issue.

Embodiments herein explain detection of the failure of the SR procedure with the resource congestion.

The UE 204 detects the failure of the SR procedure, when the number of transmissions of the SR messages to the first BS (202a, 202b) through the SCG reaches the SR transmission maximum threshold without receiving the UL resources from the first BS (202a, 202b). On detecting the failure of the SR procedure, the UE 204 initiates the follow-up RACH procedure and performs the RACH procedure with the first BS (202a, 202b) through the SCG to receive the UL grant from the first BS (202a, 202b). In response to the successful follow-up RACH procedure, the UE 204 receives PUSCH allocations from the first BS (202a, 202b) through the SCG in the RRC reconfiguration. On receiving the PUSCH configurations, the UE 204 starts waiting for the reception of the UL grant.

While waiting for the reception of the UL grant, the UE 204 determines an expected duration within that the UE 204 may be allocated with the UL grant (hereinafter referred as recovery time). In an embodiment, the UE 204 determines the recovery time using a learning-based cell database 410a.

In an example, the learning-based cell database 410a may be, but are not limited to, a machine learning (ML) model, a convolutional neural network (CNN), a deep neural network (DNN), a recurrent neural network (RNN), a restricted Boltzmann Machine (RBM), a deep belief network (DBN), a bidirectional recurrent deep neural network (BRDNN), generative adversarial networks (GAN), a deep Q-networks, an Artificial Intelligence (AI) model, a regression based neural network, and so on. The learning-based cell database 410a includes a plurality of nodes, which may be arranged in layers. Examples of the layers may be, but are not limited to, a convolutional layer, an activation layer, an average pool layer, a max pool layer, a concatenated layer, a dropout layer, a fully connected layer, a SoftMax layer, and so on. A topology of the layers may vary based on the type of the learning based cell database. In an example, the learning-based cell database 410a may include an input layer, an output layer, and a hidden layer. The input layer receives an input (for example: parameters of the UE) and forwards the received input to the hidden layer. The hidden layer transforms the input received from the input layer into a representation, which may be used for generating the output in the output layer. The hidden layers extract useful/low level features from the input, introduce non-linearity in the network and reduce a feature dimension to make the features equivariant to scale and translation. The nodes of the layers may be fully connected via edges to the nodes in adjacent layers. The input received at the nodes of the input layer may be propagated to the nodes of the output layer via an activation function that calculates the states of the nodes of each successive layer in the network based on coefficients/weights respectively associated with each of the edges connecting the layers.

In an embodiment, the UE 204 may train the learning-based cell database 410a to determine the recovery time using training datasets. The training datasets may include a mapping of parameters of the UE 204 with a typical recovery time. Examples of the parameters may be, but are not limited to, the location of the UE 104, the UE time settings, the UE date settings, cell identifier (cell ID), channel state information, and so on. The typical recovery time may be the duration within which the UE 204 has received the UL grant for the respective parameters of the UE 204. The training datasets may be collected from the previously performed SR procedures on the UE 204. In another embodiment, the UE 204 may receive the learning-based cell database 410a from at least one external entity (for example: an external server) to determine the recovery time.

For determining the recovery time (the expected duration within that the UE 204 may be allocated with the UL grant), the UE 204 provides current parameters such as, but are not limited to, the location of the UE 104, the UE time settings, the UE date settings, the cell ID, the channel state information, and so on, to the learning-based cell database 410a. The learning-based cell database 410a processes the parameters received from the UE 204 and determines the recovery time.

The UE 204 compares a duration for which the UE 204 is waiting for the reception of the UL grant with the recovery time. The UE 204 continues to wait for the reception of the UL grant, if the duration for which the UE is waiting for the UL grant is lesser than the recovery time. The UE 204 detects the failure of the SR procedure with the resource congestion, if the duration for which the UE 204 is waiting for the reception of the UL grant is equal to or greater than the recovery time. The resource congestion depicts that the first BS (202a, 202b) does not have resources required for allocating the UL grant to the UE 204.

On detecting the at least one UL grant failure, the UE 204 indicates the UL grant failure (i.e., a failure in sending the SR messages to the first BS (202a, 202b) through the SCG (i.e., the first frequency received in the first RRC)) to the second BS. In an embodiment, the second BS may be the MN 202a. The UE 204 indicates the failure in sending the SR messages to the first BS (202a, 202b)/UL grant failure by sending a non-RACH message to the second BS 202a via the MCG/MCG signaling. In an embodiment, the non-RACH message includes an SCG failure report. The SCG failure report may include a cause value that depicts a cause for the UL grant failure. In an example, the cause value may include existing 3GPP cause values such as, but are not limited to, t310expiry, rlcMaxReTx, and so on. In another embodiment, the non-RACH message includes information such as, but are not limited to, a Radio Link Failure (RLF), a handover failure, and so on.

On indicating the UL grant failure to the second BS 202*a*, the UE 204 releases the SCG (that has been added on receiving the first RRC configuration from the first BS (202*a*, 202*b*)).

In response to indicating the UL grant failure to the second BS 202*a*, the UE 204 receives measurement configurations of the SCG from the second BS 202*a* through the MCG. On receiving the measurement configurations of the SCG, the UE 204 sends a measurement report related to the SCG to the second BS 202*a* through the MCG. In response to the sent measurement report, the UE 204 receives a second RRC configuration (RRC reconfiguration) including a second frequency/new SCG from the second BS 202*a*. In an embodiment herein, the second frequency/new SCG may be the same first frequency/SCG, which has been released by the UE 204. In another embodiment, the second frequency/ new SCG may be a different secondary primary cell (SPcell) associated with the same first frequency/SCG, which has been released by the UE 204. The UE 204 adds the received second frequency/SCG by sending a RRC reconfiguration complete to the second BS 202*a*, which provides the UE 204 with the lost SR resources. Thus, the UE 204 revives the lost SR resources by avoiding unnecessary signaling overload and with less power consumption. In addition, the UE 204 may release and add the SCG with fast recovery time ranging between few milli seconds to a few seconds, so that user experience may not be degraded.

FIG. 2 shows blocks of a wireless communication system 200, but it is to be understood that other embodiments are not limited thereon. In other embodiments, the wireless communication system 200 may include less or more number of blocks. Further, the labels or names of the blocks are used only for illustrative purpose and does not limit the scope of the embodiments herein. One or more blocks can be combined together to perform same or substantially similar function in the wireless communication system 200.

Figure 3:
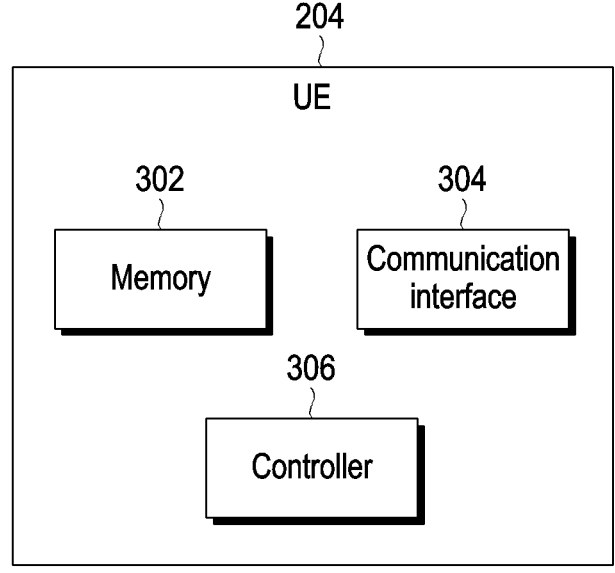
FIG. 3 is an example block diagram depicting various components of a User Equipment (UE) for reviving SR resources, according to an embodiment of the disclosure.

FIG. 3 is an example block diagram depicting various components of a UE for reviving SR resources, according to an embodiment of the disclosure.

Referring to FIG. 3, a UE 204 includes a memory 302, a communication interface (or transceiver) 304, and a controller 306. The UE 204 may also include a Radio Frequency (RF) transceiver, a signal processing circuitry, an Input/ Output ports, a display, and so on (not shown).

The memory 302 stores at least one of, RRC configurations, the duration within which the UE 204 has allocated the UL resources, the training datasets, the learning-based cell database 410*a*, an SR resource manager 400, and so on. The SR resource manager 400 may be executed/processed by the controller 306 to revive the SR resources. Examples of the memory 302 may be, but are not limited to, NAND, embedded Multimedia Card (eMMC), Secure Digital (SD) cards, Universal Serial Bus (USB), Serial Advanced Technology Attachment (SATA), solid-state drive (SSD), and so on. Further, the memory 302 may include one or more computer-readable storage media. The memory 302 may include one or more non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory 302 may, in some examples, be considered a non-transitory storage medium. The term "non-transitory" may indicate that the storage medium is not embodied in a carrier wave or a propagated signal. However, the term "non-transitory" should not be interpreted to mean that the memory is non-movable. In certain examples, a non-transitory storage medium may store data that can, over time, change (e.g., in Random Access Memory (RAM) or cache).

The communication interface 304 may be configured to enable the UE 204 to communicate with the at least one BS using an interface supported by the respective RAT. Examples of the interface may be, but are not limited to, a wired interface, a wireless interface, a wired interface, or any structure supporting communications over a wired or wireless connection. The communication interface 304 may include transmitter and receiver for communicating signals.

The controller 306 may include a single processer, a plurality of processors, multiple homogeneous or heterogeneous cores, multiple Central Processing Units (CPUs) of different kinds, microcontrollers, special media, and other accelerators.

The controller 306 may be configured to revive the SR resources, which has been lost due to failure in sending the SR message to the first BS (202*a*, 202*b*) through the at least one frequency/carrier. The frequency/carrier may be the SCG or the secondary carrier. The first BS (202*a*, 202*b*) may be the MN 202*a* or the SN 202*b*.

The controller 306 receives the RRC configuration from the first BS (202*a*, 202*b*) through the MCG. The RRC includes the SCG associated with the SN 202*b*. The controller 306 adds the SCG associated with the SN 202*b*, to receive the additional resources from the SN 202*b*. The controller 306 initiates the SR procedure with the first BS (202*a*, 202*b*) through the SCG by applying the received RRC configuration, when the UE 204 wants to perform the UL transmission. The controller 306 initiates the SR procedure to receive the UL grant from the first BS (202*a*, 202*b*) through the SCG to perform the UL transmission.

In response to the initiated SR procedure, the controller 306 may receive the UL grant from the first BS (202*a*, 202*b*) through the SCG. The controller 306 enables the UE 204 to perform the UL transmission using the received UL grant.

Alternatively, in response to the initiated SR procedure, the controller 306 may detect the UL grant failure, wherein the UE 204 has lost the SR resources without receiving the UL grant from the first BS (202*a*, 202*b*) through the SCG. In an example, the UL grant failure may include at least one of, but is not limited to, the failure of the SR procedure, the failure of the SR procedure and the failure of the follow-up RACH procedure, the failure of the SR procedure with no PUCCH configurations, the failure of the SR procedure with the PUCCH UL channel issue, the failure of the SR procedure with the resource congestion, and so on.

On detecting the UL grant failure, the UE 204 revives the SR resources. For reviving the SR resources, the UE 204 indicates the UL grant failure to the second BS through the associated MCG and releases the added SCG. The second BS may be the MN 202*a*. In response to indicating the second BS 202*a* about the UL grant failure, the UE 204 receives the RRC reconfiguration including the new SCG. The UE 204 performs addition of the new SCG, which has been indicated by the second BS 202*a* for reviving the lost SR resources. The added SCG may be the same SCG, which has been released. The added SCG may be the different Spcell associated with the same SCG, which has been released. Thus, the SR resources may be revived by releasing the SCG and newly adding the SCG, on detecting the UL grant failure.

The controller 306 may be configured to execute the SR resources manager 400 to revive the SR resources, which have been lost due to the UL grant failure.

Figure 4:
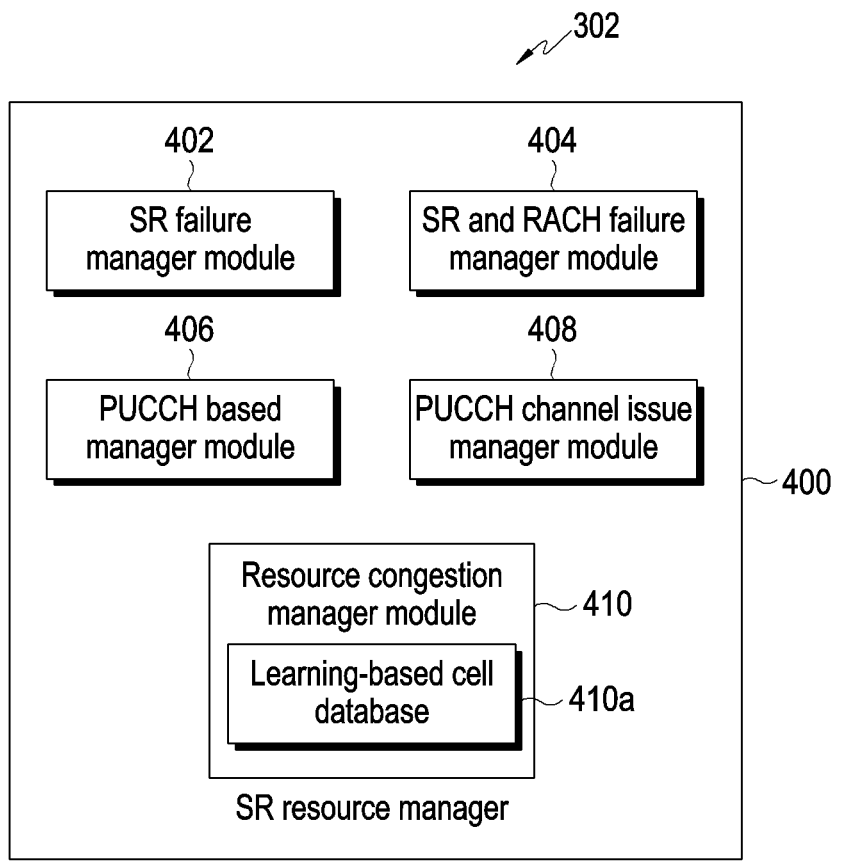
FIG. 4 depicts an SR resource manager performable in a UE to revive SR resources, according to an embodiment of the disclosure.

FIG. 4 depicts an SR resource manager performable in the UE to revive the SR resources, according to an embodiment of the disclosure.

Referring to FIG. 4, an SR resource manager 400 includes an SR failure manager module 402, an SR and RACH failure manager module 404, a PUCCH based manager module 406, a PUCCH channel issue manager module 408, and a resource congestion manager module 410.

The SR failure manager module 402 may be configured to revive the SR resources, on detecting the failure of the SR procedure. Whenever the UE 204 wants to perform the UL transmission, the SR failure manager module 402 performs the SR procedure with the first BS (the MN 202a or the SN 202b) through the SCG/first frequency for the UL grant. The configurations of the SCG have been received by the UE 204 from the first BS (202a, 202b) in the first RRC configuration. The SR procedure may involve transmitting the SR messages recursively to the first BS (202a, 202b) through the SCG/first frequency, until receiving the UL grant or the number of transmissions of the SR messages reaches the SR transmission maximum threshold. The SR failure manager module 402 detects the failure of the SR procedure, if the number of transmissions of the SR messages reaches the SR transmission maximum threshold without receiving the UL grant. On detecting the failure of the SR procedure, the SR failure manager module 402 releases the SCG and indicates the failure of the SR procedure to the second BS (the MN 202a) through the MCG. The SR failure manager module 402 indicates the failure of the SR procedure to the second BS 202a by transmitting the non-RACH message to the second BS 202a through the MCG. In response to the transmitted non-RACH message, the SR failure manager module 402 receives the second RRC message indicating the SCG/second frequency from the second BS 202a. The SR failure manager module 402 adds the indicated the SCG/second frequency, which provides the lost SR resources to the UE 204.

The SR and RACH failure manager module 404 may be configured to revive the SR resources, on detecting the failure of the SR procedure and the follow-up RACH procedure. Whenever the UE 204 wants to perform the UL transmission, the SR and RACH failure manager module 404 performs the SR procedure with the first BS (202a, 202b) through the SCG/first frequency (which has been indicated by the first BS (202a, 202b) in the first RRC configuration) for the UL grant. The SR and RACH failure manager module 404 detects the failure of the SR procedure, when the UE 204 has lost the SR resources without receiving the UL grant from the first BS (202a, 202b) through the SCG. On detecting the failure of the SR procedure, the SR and RACH failure manager module 404 performs the follow-up RACH procedure recursively for the pre-defined number of RACH attempts. The SR and RACH failure manager module 404 detects the failure of the SR procedure with the failure of the follow-up RACH procedure, if the SR and RACH failure manager module 404 has not received the UL grant after performing the follow-up RACH procedure for the pre-defined number of RACH attempts. On detecting the failure of the SR procedure and the failure of the follow-up RACH procedure, the SR and RACH failure manager module 404 releases the SCG/first frequency and indicates the failure of the SR procedure to the second BS 202a by transmitting the non-RACH message to the second BS 202a through the MCG. In response to the transmitted non-RACH message, the SR and RACH failure manager module 404 receives the second RRC message indicating the SCG/second frequency and adds the indicated the SCG/second frequency, which provides the lost SR resources to the UE 204.

The PUCCH based manager module 406 may be configured to revive the SR resources, on detecting the failure of the SR procedure with no PUCCH configurations. Whenever the UE 204 wants to perform the UL transmission, the PUCCH based manager module 406 performs the SR procedure with the first BS (202a, 202b) through the SCG/first frequency (which has been indicated by the first BS (202a, 202b) in the first RRC message) for the UL grant. The PUCCH based manager module 406 detects the failure of the SR procedure, when the SR resources have been lost without receiving the UL grant. On detecting the failure of the SR procedure, the PUCCH based manager module 406 performs the follow-up RACH procedure with the first BS (202a, 202b) through the SCG. The PUCCH based manager module 406 detects the failure of the SR procedure with no PUCCH configurations, when the PUCCH based manager module 406 have not been received the PUCCH configurations from the first BS (202a, 202b) through the SCG/first frequency after the successful follow-up RACH procedure. On detecting the failure of the SR procedure with no PUCCH configurations, the PUCCH based manager module 406 releases the SCG/first frequency and indicates the failure of the SR procedure to the second BS 202a by transmitting the non-RACH message to the second BS 202a through the MCG. In response to the transmitted non-RACH message, the PUCCH based manager module 406 receives the second RRC message indicating the SCG/second frequency and adds the indicated the SCG/second frequency, which provides the lost SR resources to the UE 204.

The PUCCH channel issue manager module 408 may be configured to revive the SR resources, on detecting the failure of the SR procedure with the PUCCH UL channel issue. Whenever the UE 204 wants to perform the UL transmission, the PUCCH channel issue manager module 408 performs the SR procedure with the HARQ ACK with the first BS (202a, 202b) through the SCG/first frequency (which has been indicated by the first BS (202a, 202b) in the first RRC message) for the UL grant. The SR procedure with the HARQ ACK involves transmitting the SR message with the HARQ ACK to the first BS (202a, 202b) through the SCG/first frequency recursively, until the UL grant has been received or the number of transmissions of the SR messages with the HARQ ACK reaches the SR maximum transmission threshold. The PUCCH channel issue manager module 408 may transmit the HARQ ACK to the first BS (202a, 202b) as the acknowledgment for the previously received DL PDSCH packet. The PUCCH channel issue manager module 408 detects the failure of the SR procedure for the UL grant request, if the number of transmissions of the SR messages with the HARQ ACK reaches the SR transmission maximum threshold without receiving the UL grant.

On detecting the failure of the SR procedure for the UL grant request, the PUCCH channel issue manager module 408 performs the follow-up RACH procedure with the first BS (202a, 202b) through the SCG for the reception of the UL grant. The PUCCH channel issue manager module 408 detects the PUCCH UL channel issue, if the PUCCH channel issue manager module 408 receives the DL PDSCH packet from the first BS (202a, 202b) through the SCG, after performing the follow-up RACH procedure. The PUCCH channel issue manager module 408 detects that PUCCH UL channel is in bad condition, as the PUCCH channel issue manager module 408 has received the previously received DL PDSCH packet. On detecting the PUCCH UL channel issue, the PUCCH channel issue manager module 408 releases the SCG/first frequency and reports the failure of the SR procedure with the PUCCH channel issue to the second BS 202a through the MCG. In response to the reported failure, the PUCCH channel issue manager module 408 receives the second RRC configuration/message indicating the SCG/second frequency and adds the indicated the SCG/second frequency, which provides the lost SR resources to the UE 204.

The resource congestion manager module 410 may be configured to revive the SR resources, on detecting the failure of SR procedure with the resource congestion. Whenever the UE 204 wants to perform the UL transmission, the resource congestion manager module 410 performs the SR procedure with the first BS (202a, 202b) through the SCG/first frequency (which has been indicated by the first BS (202a, 202b) in the first RRC message) for the UL grant. The resource congestion manager module 410 detects the failure of the SR procedure, when the SR resources have been lost without receiving the UL grant. On detecting the failure of the SR procedure, the resource congestion manager module 410 performs the follow-up RACH procedure. In response to the successful follow-up RACH procedure, the resource congestion manager module 410 receives the PUSCH allocations from the first BS (202a, 202b) through the SCG/first frequency. On receiving the PUSCH allocations, the resource congestion manager module 410 waits to receive the UL grant from the first BS (202a, 202b) through the SCG. The resource congestion manager module 410 further determines the recovery time within which the UL grant may be allocated for the UE 204. The resource congestion manager module 410 may use the learning-based cell database 410a to determine the recovery time.

The learning-based cell database 410a may comprise of a plurality of neural network layers. Each layer has a plurality of weight values and performs a layer operation through calculation of a previous layer and an operation of a plurality of weights/coefficients. Examples of the learning-based cell database 410a include at least one of, but is not limited to, a convolutional neural network (CNN), a deep neural network (DNN), a recurrent neural network (RNN), a restricted Boltzmann Machine (RBM), a deep belief network (DBN), a bidirectional recurrent deep neural network (BRDNN), generative adversarial networks (GAN), a regression based neural network, a deep Q-network, and so on.

The learning-based cell database 410a may be trained using at least one learning method to determine the recovery time within which the UE 204 may be allocated with the UL grant. Examples of the learning method may be, but are not limited to, supervised learning, unsupervised learning, semi-supervised learning, reinforcement learning, regression-based learning, and so on. A function associated with the learning method may be performed through the non-volatile memory, the volatile memory, and the controller 306.

The controller 306 may include one or a plurality of processors. At this time, one or a plurality of processors may be a general-purpose processor, such as a central processing unit (CPU), an application processor (AP), or the like, a graphics-only processing unit such as a graphics processing unit (GPU), a visual processing unit (VPU), and/or an Artificial Intelligence (AI)-dedicated processor such as a neural processing unit (NPU).

The one or a plurality of processors may determine the recovery time within which the UE 204 may be allocated with the UL grant, in accordance with a predefined operating rule of the learning-based cell database 410a stored in the non-volatile memory and the volatile memory. The predefined operating rules of the neural network are provided through training the learning-based cell database 410a using the learning method.

Here, being provided through learning expresses that, by applying the learning method to a plurality of learning data (for example: the training datasets including the mapping of the parameters of the UE 204 with the typical recovery time), a predefined operating rule or AI model of a desired characteristic is made. The determination of the recovery time may be performed in the UE 204 itself in which the learning according to an embodiment is performed, and/or may be implemented through a separate server/system.

For determining the recovery time, the resource congestion manager module 410 provides the current parameters of the UE 204 to the learning-based cell database 410a. The learning based cell database 410a processes the current parameters of the UE 204 using the mapping of the parameters of the UE 204 with the typical recovery time and determines the recovery time within which the UE 204 may be allocated with the UL grant.

On determining the recovery time, the resource congestion manager module 410 compares the duration for which the UE 204 is waiting for the UL grant with the determined recovery time. The resource congestion manager module 410 enables the UE 204 to wait for the UL grant, if the determined duration for which the UE 204 is waiting for the UL grant is lesser than the recovery time. The resource congestion manager module 410 detects the resource congestion, if the determined duration for which the UE 204 is waiting for the UL grant is greater than or equal to the recovery time. The resource congestion depicts that the first BS (202a, 202b) does not have the resources to allocate the UL grant for the UE 204.

On detecting the failure of the SR procedure with the resource congestion, the resource congestion manager module 410 releases the SCG/first frequency and reports the failure of the SR procedure with the resource congestion to the second BS 202a through the MCG. In response to the reported failure, the resource congestion manager module 410 receives the second RRC message indicating the SCG/second frequency from the second BS 202a and adds the indicated the SCG/second frequency, which provides the lost SR resources to the UE 204.

The resource congestion manager module 410 may also be configured to update the learning-based cell database 410a, if the UE 204 has received the UL grant from the first BS (202a, 202b). The resource congestion manager module 410 updates the learning-based cell database 410a using the duration within which the UE 204 has received the UL grant and the associated parameters. The resource congestion manager module 410 may also be configured to update the learning-based cell database 410a, on reporting the failure of the SR procedure to the second BS 202a.

FIGS. 3 and 4 show blocks of a UE, but it is to be understood that other embodiments are not limited thereon. In other embodiments, the UE (e.g., UE 204) may include less or more blocks. Further, the labels or names of the blocks are used only for illustrative purpose and does not limit the scope of the embodiments herein. One or more blocks can be combined together to perform same or substantially similar function in the UE.

FIG. 5 is a flow diagram depicting a method for reviving SR resources, according to an embodiment of the disclosure.

Referring to FIG. 5, at operation 502, a method for reviving SR resources includes receiving, by a UE 204, the first RRC configuration including the first frequency from the first BS (202a, 202b). The first frequency depicts the SCG or the secondary carrier associated with the SN 202*b*, with which the UE 204 has been connected using the DC.

At operation 504, the method includes requesting, by the UE 204, the first BS (202*a*, 202*b*) through the SCG/first frequency to allocate the UL grant for the UL transmission by applying the received first RRC configuration.

At operation 506, the method includes detecting, by the UE 204, the UL grant failure, where the UE 204 has lost the SR resources without receiving the UL grant from the first BS (202*a*, 202*b*) through the SCG/first frequency. The UL grant failure may include the failure of the SR procedure, the failure of the SR procedure with the failure of the follow-up RACH procedure, the failure of the SR procedure with no PUCCH configurations, the failure of the SR procedure with the PUCCH UL channel issue, and the failure of the SR procedure with the resource congestion.

At operation 508, the method includes releasing, by the UE 204, the SCG/first frequency by reporting the UL grant failure to the second BS 202*a* through the MCG.

At operation 510, the method includes receiving, by the UE 204, the second RRC configuration including the second frequency from the second BS 202*a* through the MCG. At operation 512, the method includes adding, by the UE 204, the second frequency for reviving the lost SR resources. The second frequency may be the same SCG/first frequency, which has been released. Alternatively, the second frequency may be the different Spcell associated with the same SCG/first frequency, which has been released. The various actions in the method of FIG. 5 may be performed in the order presented, in a different order or simultaneously. Further, in some embodiments, some actions listed in FIG. 5 may be omitted.

Embodiments herein further explain reviving of the SR resources by considering that the UE 204 operates by supporting the MR-DC as an example, but it is obvious to a person skilled in the art that any other DC across the different RATs may be considered. In the MR-DC, the UE 204 connects to the MN 202*a* and the SN 202*b* of the NR/5G network. Thereby, the UE 204 may be configured with the serving frequencies such as the MCG and the SCG by connecting to the MN 202*a* and the SN 202*b*, respectively. The MCG and SCG may be NR resources.

Figure 6:
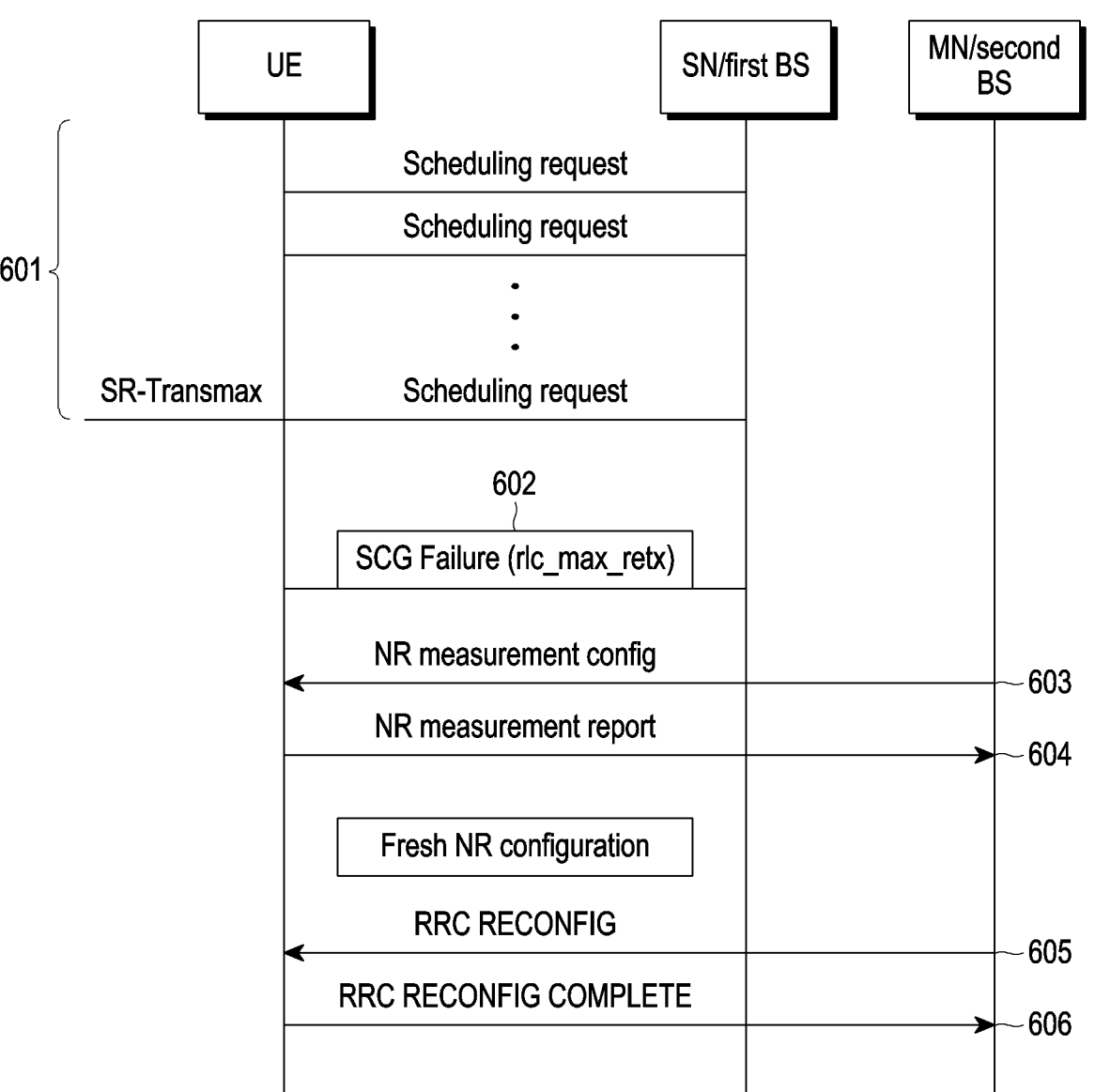
FIG. 6 is an example sequence diagram depicting a process of reviving SR resources, on detecting a failure of an SR procedure, according to an embodiment of the disclosure.

FIG. 6 is an example sequence diagram depicting a process of reviving SR resources, on detecting a failure of an SR procedure, according to an embodiment of the disclosure.

Referring to FIG. 6, at operation 601, a UE 204 initiates the SR procedure with the first BS (202*a*, 202*b*) (hereinafter considered as the SN 202*b* for example) through the SCG (which has been indicated in the first RRC/NR configuration received from the SN 202*b*), for receiving the UL grant to perform the UL transmission. The SR procedure involves transmitting the SR messages to the SN 202*b* through the SCG over the PUCCH/SR resources recursively, until the UL grant for the at least one UL transmission are received or the number of transmissions of the SR messages reaches the SR transmission maximum threshold.

At operation 602, the UE 204 detects the failure of the SR procedure, as the number of transmissions of the SR messages reaches the SR transmission maximum threshold without receiving the UL grant from the SN 202*b* through the SCG. The failure of the SR procedure depicts that the UE 204 has lost the SR resources/PUCCH resources for transmitting the SR messages to the SN 202*b* through the SCG. The UE 204 reports the failure of the SR procedure to the SN 202*b* through the MCG signaling in the non-RACH message and releases the SCG. The non-RACH message includes the SCG failure report.

At operation 603, the UE 204 receives a NR measurement configuration related to the SCG from the MN/second BS 202*a*. At operation 604, in response to the received NR measurement configuration, the UE 204 transmits a NR measurement report related to the SCG to the MN 202*a*. At operation 605, the UE 204 receives the second RRC/fresh NR configuration related to the SCG in the RRC reconfiguration. At operation 606, in response to the received RRC reconfiguration, the UE 204 transmits the RRC reconfiguration complete message to the MN 202*a* by adding the SCG indicated in the RRC reconfiguration. The SCG may be the same SCG, which has been released by the UE 204. Thereby, reviving the SR resources to transmit the SR messages to the SN 202*b* through the SCG for the UL grant.

Figure 7:
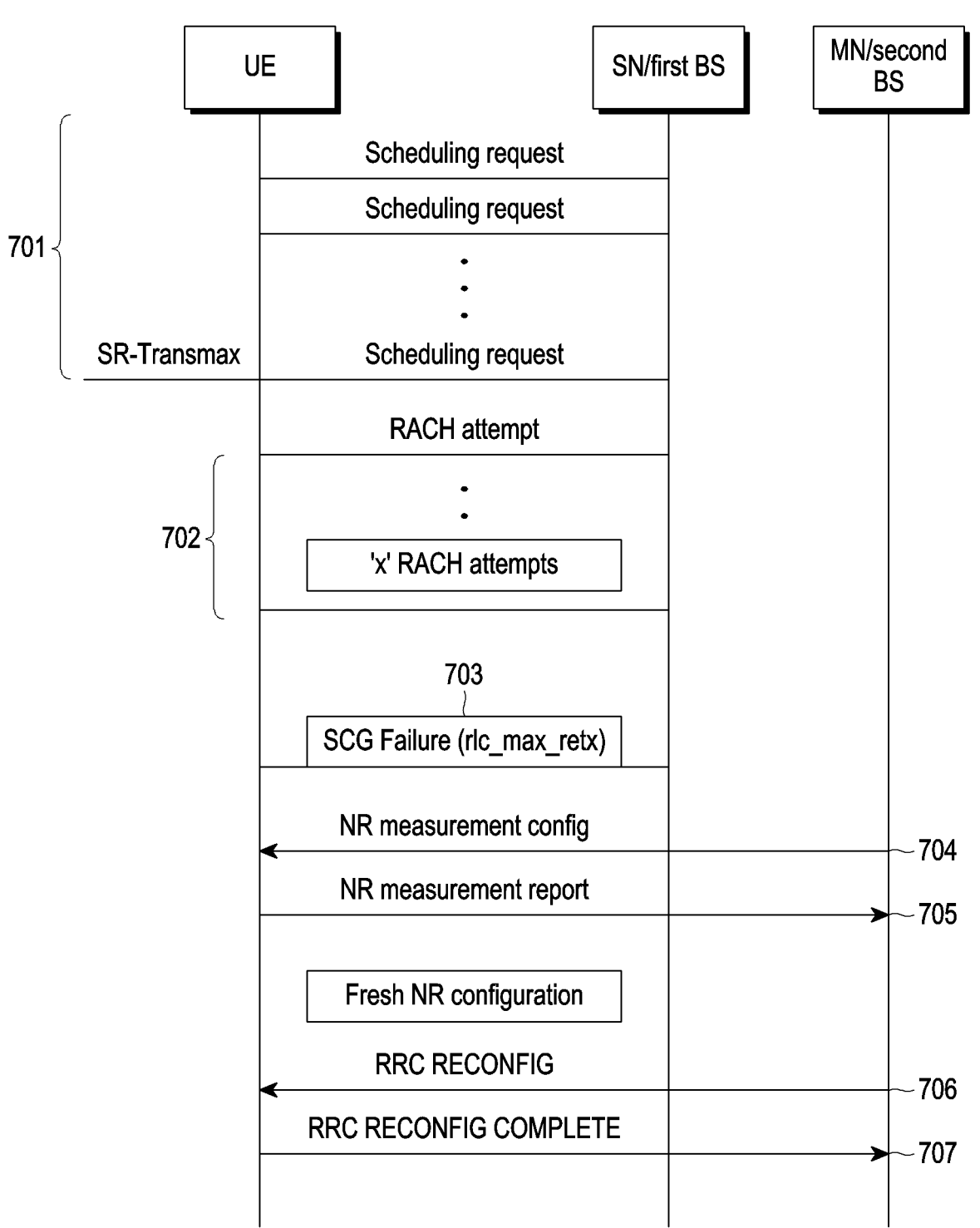
FIG. 7 is an example sequence diagram depicting a process of reviving SR resources, on detecting a failure of an SR procedure and a failure of a follow-up Random Access Channel (RACH) procedure, according to an embodiment of the disclosure.

FIG. 7 is an example sequence diagram depicting a process of reviving SR resources, on detecting a failure of an SR procedure and a failure of a follow-up RACH procedure, according to an embodiment of the disclosure.

Referring to FIG. 7, at operation 701, a UE 204 initiates the SR procedure with the first BS (202*a*, 202*b*) (for example herein, the SN 202*b*) through the SCG (which has been indicated in the first RRC/NR configuration received from the SN 202*b*), for receiving the UL grant to perform the UL transmission. The SR procedure involves transmitting the SR messages to the SN 202*b* through the SCG over the PUCCH/SR resources recursively, until the UL grant for the at least one UL transmission are received or the number of transmissions of the SR messages reaches the SR transmission maximum threshold.

At operation 702, the UE 204 detects the failure of the SR procedure and initiates the follow-up RACH procedure with the SN 202*b* through the SCG. The UE 204 detects the failure of the SR procedure, on identifying that the number of transmissions of the SR messages reaches the SR transmission maximum threshold (i.e., the failure of the SR resources). The UE 204 performs the follow-up RACH procedure recursively for the pre-defined number of RACH attempts.

At operation 703, the UE 204 detects the failure of the follow-up RACH procedure, when the UE 204 has not received the UL grant even after performing the follow-up RACH procedure for the pre-defined number of RACH attempts. On detecting the failure of the SR procedure and the follow-up RACH procedure, the UE 204 reports the failure of the SR procedure to the MN/second BS 202*a* through the MCG signaling in the non-RACH message and releases the SCG. The non-RACH message includes the SCG failure report.

At operation 704, the UE 204 receives the NR measurement configuration related to the SCG from the MN 202*a*. At operation 705, in response to the received NR measurement configuration, the UE 204 transmits the NR measurement report related to the SCG to the MN 202*a*. At operation 706, the UE 204 receives the second RRC/fresh NR configuration related to the SCG in the RRC reconfiguration message. At operation 707, in response to the received RRC reconfiguration message, the UE 204 transmits the RRC reconfiguration complete message to the MN 202*a* by adding the SCG indicated in the RRC reconfiguration message. The SCG may be the same SCG, which has been released by the UE 204. Thereby, reviving the SR resources to transmit the SR messages to the SN 202*b* through the SCG for the UL grant.

Figure 8:
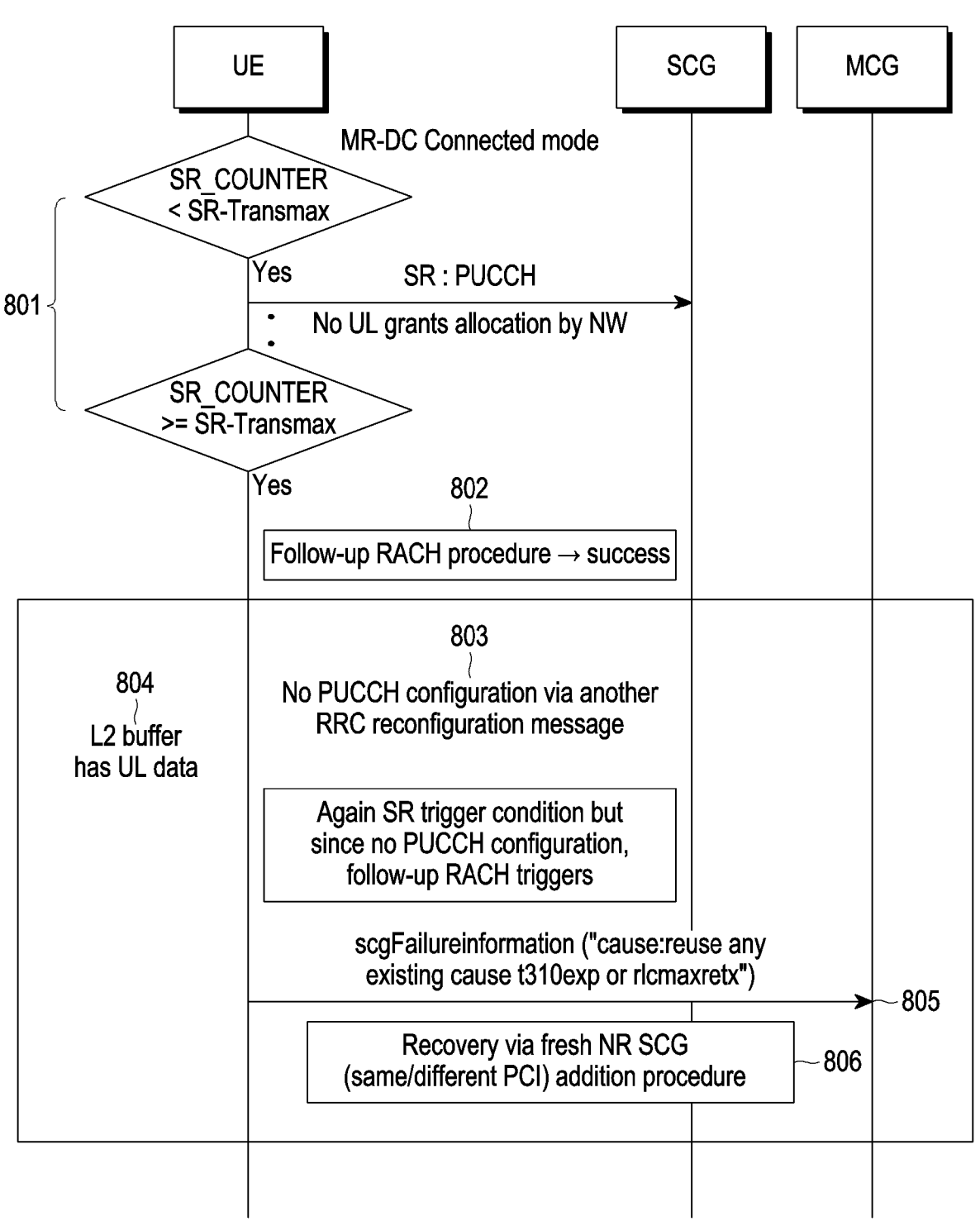
FIG. 8 is an example sequence diagram depicting a process of reviving SR resources, on detecting a failure of an SR procedure with no Physical Uplink Control Channel (PUCCH) configurations, according to an embodiment of the disclosure.

FIG. 8 is an example sequence diagram depicting a process of reviving SR resources, on detecting a failure of an SR procedure with no PUCCH configurations, according to an embodiment of the disclosure.

Referring to FIG. 8, at operation 801, a UE 204 initiates the SR procedure with the first BS (202a, 202b) (for example; the SN 202b) through the SCG, when the UE 204 wants to perform the UL transmission. The configurations of the SCG have been received by the UE 204 from the SN 202b in the first RRC configuration. To perform the SR procedure, the UE 204 triggers the "SR counter," which has been initialized to '0'. On triggering the "SR counter," the UE 204 recursively performs operations of: sending the SR message to the SN 202b through the SCG, checking if the value of the "SR counter" has reached the SR transmission maximum threshold and incrementing the value of the SR counter to '1', if the value of the SR counter has not reached the pre-defined maximum value, until receiving the UL resources from the SN 202b through the SCG or the value of the SR counter reaches the SR transmission maximum threshold without receiving the UL resources from the SN 202b. The UE 204 detects the failure of the SR procedure, when the value of the SR counter reaches the SR transmission maximum threshold without receiving the UL resources from the SN 202b through the SCG.

On detecting the failure of the SR procedure, at operation 802, the UE 204 performs the successful follow-up RACH procedure with the SN 202b through the SCG. At operation 803, the UE 204 identifies that the UE 204 has not received the PUCCH configurations from the SN 202b through the SCG, even after the successful RACH procedure. At operation 804, the UE 204 identifies the new SR trigger condition, on arrival of the UL data at the L2 buffer.

On identifying that the UE 204 has not received the PUCCH configurations from the SN 202b through the SCG, and the new SR condition has been triggered, at operation 805, the UE 204 transmits the SCG failure report to the MN 202a through the MCG signaling. The UE 204 releases the SCG/first frequency. The UE 204 includes the cause value in the SCG failure report, which depicts cause for the failure of the SR procedure.

At operation 806, the UE 204 receives the new NR configuration indicating the new SCG from the MN 202a in the RRC reconfiguration message. The UE 204 adds the new SCG indicated by the MN 202a for reviving the SR resources. The new SCG may be the same SCG, which has been released. Alternatively, the new SCG may be the different Spcell associated with the SCG.

Figure 9:
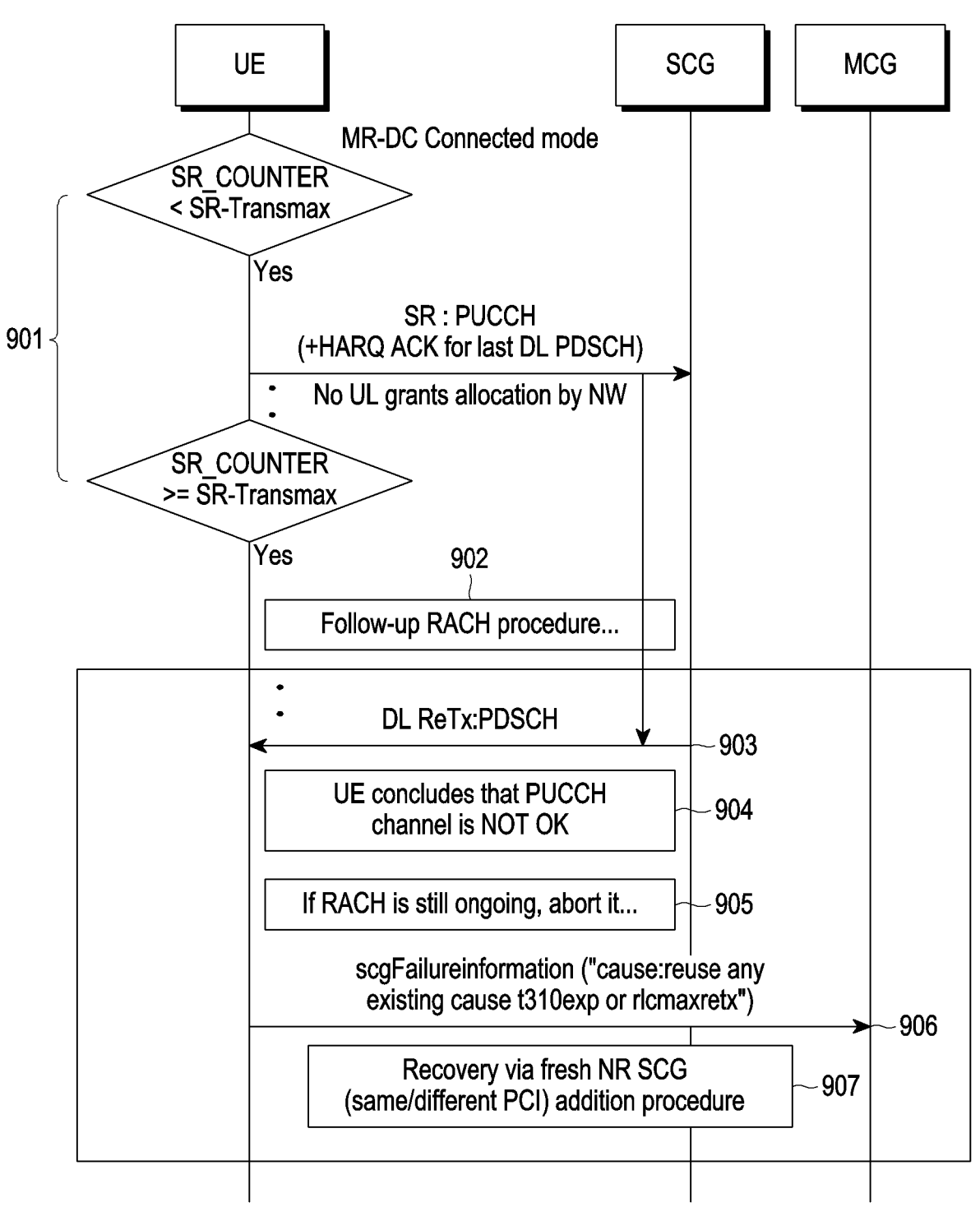
FIG. 9 is an example sequence diagram depicting a process of revving SR resources, on detecting a failure of an SR procedure with a PUCCH Uplink (UL) channel issue, according to an embodiment of the disclosure.

FIG. 9 is an example sequence diagram depicting a process of revving SR resources, on detecting a failure of an SR procedure with a PUCCH UL channel issue, according to an embodiment of the disclosure.

Referring to FIG. 9, at operation 901, a UE 204 initiates the SR procedure along with the HARQ ACK with the first BS (202a. 202b) (for example herein: the SN 202b) through the SCG, when the UE 204 wants to perform the UL transmission. The configurations of the SCG have been received by the UE 204 from the SN 202b in the RRC configuration. To perform the SR procedure with the HARQ ACK, the UE 204 triggers the "SR counter," which has been initialized to '0'. On triggering the "SR counter", the UE 204 recursively performs operations of: sending the SR message with the HARQ ACK to the SN 202b through the SCG, checking if the value of the "SR counter" has reached the SR transmission maximum threshold and incrementing the value of the SR counter to '1', if the value of the SR counter has not reached the pre-defined maximum value, until receiving the UL resources from the SN 202b through the SCG or the value of the SR counter reaches the SR transmission maximum threshold without receiving the UL resources from the SN 202b. The HARQ ACK may be sent to the SN 202b, as the acknowledgement for the previously received DL PDSCH packet. The UE 204 detects the failure of the SR procedure, when the value of the SR counter reaches the SR transmission maximum threshold without receiving the UL resources from the SN 202b through the SCG.

On detecting the failure of the SR procedure, at operation 902, the UE 204 initiates the follow-up RACH procedure with the SN 202b through the SCG.

At operation 903, the UE 204 receives the previous DL PDSCH packet from the SN 202b through the SCG. The MN 202a may retransmit the previous DL PDSCH packet to the UE 204 by misinterpreting the HARQ ACK as the negative acknowledgment (NACK). The reception of the previous DL PDSCH packet depicts that either the PUCCH configuration may not be received by the UE 204 from the SN 202b or the corrupted PUCCH configuration may be received by the UE 204 from the SN 202b.

On receiving the previous DL PSCH packet from the SN 202b through the SCG, at operation 904, the UE 204 determines the PUCCH UL channel issue. On determining the PUCCH UL channel issue, at operation 905, the UE 204 aborts the follow-up RACH procedure, if the follow-up RACH procedure is still ongoing.

At operation 906, the UE 204 transmits the SCG failure report to the MN 202a through the MCG signaling. The UE 204 releases the SCG/first frequency. The UE 204 includes the cause value in the SCG failure report, which depicts cause for the failure of the SR procedure.

At operation 907, the UE 204 receives the new NR configuration indicating the new SCG from the MN 202a in the RRC reconfiguration message. The UE 204 adds the new SCG indicated by the MN 202a for reviving the SR resources. The new SCG may be the same SCG, which has been released. Alternatively, the new SCG may be the different Spcell associated with the SCG.

Figure 10:
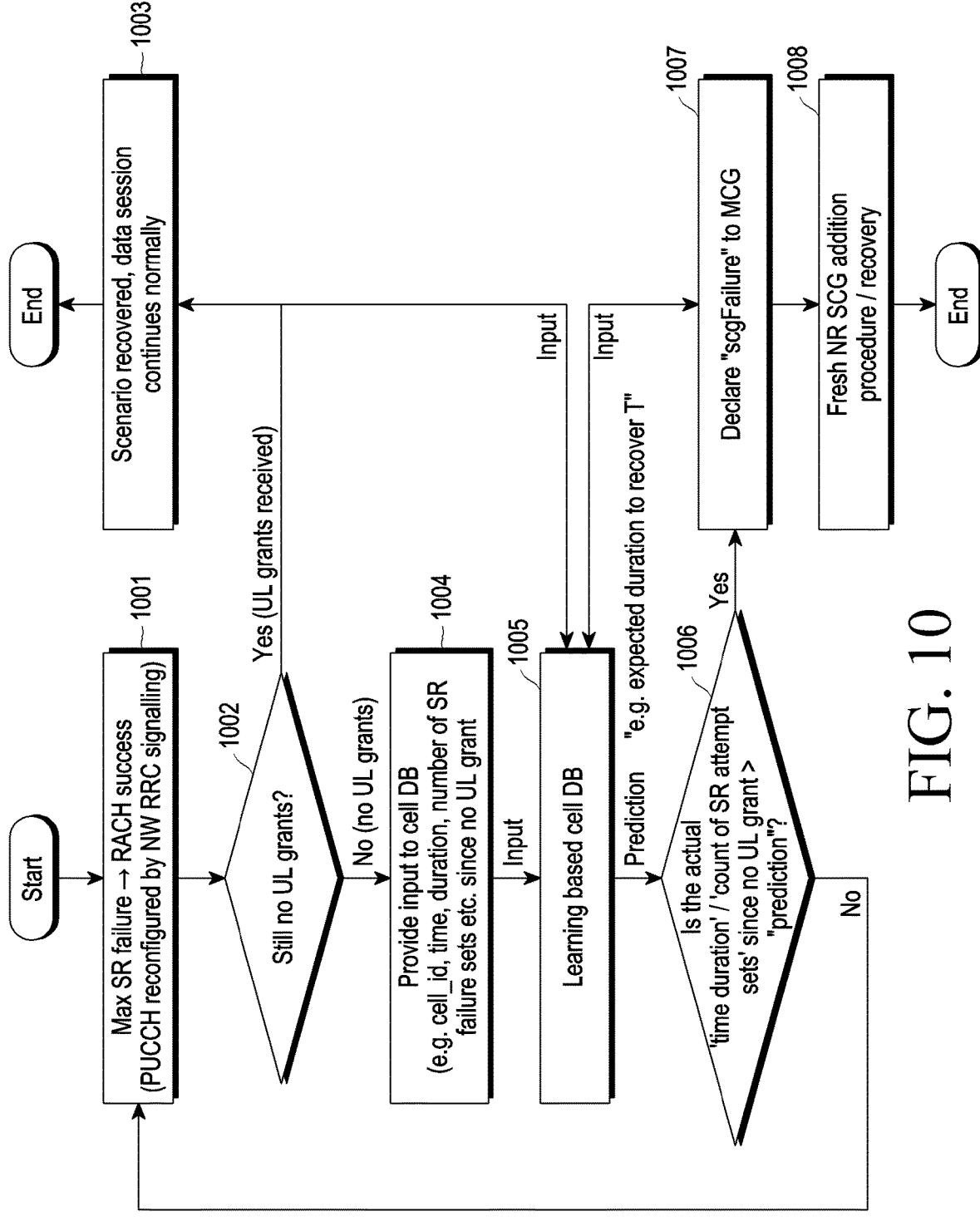
FIG. 10 is an example sequence diagram depicting a process of reviving SR resources, on detecting a failure of an SR procedure with resource congestion, according to an embodiment of the disclosure.

FIG. 10 is an example sequence diagram depicting a process of reviving SR resources, on detecting a failure of an SR procedure with resource congestion, according to an embodiment of the disclosure.

FIG. 11 depicts an example training dataset used to train a learning-based cell database, according to an embodiment of the disclosure.

Referring to FIGS. 10 and 11, at operation 1001, a UE 204 initiates the SR procedure with the first BS (202a, 202b) (for example herein: the SN 202b) through the SCG for receiving the UL grant to perform the UL transmission. On detecting the failure of the SR procedure, the UE 204 performs the follow-up RACH procedure with the SN 202b through the SCG. The UE 204 receives the PUSCH allocations from the SN 202b through the SCG in the RRC reconfiguration, on the successful follow-up RACH procedure.

At operation 1002, the UE 204 checks if the UE 204 has received the UL grant from the SN 202b through the SCG. If the UE 204 has received the UL grant, at operation 1003, the UE 204 performs the UL transmission using the received UL grant and updates the learning-based cell database 410a. The UE 204 updates the learning-based cell database 410a using the mapping of the parameters of the UE 204 (location of the UE 204, the UE date settings, the cell id) with the duration within which the UE 204 has received the UL grant from the SN 202b.

If the UE 204 has not received the UL grant, at operation 1004, the UE 204 provides the parameters of the UE 204, the number of SR failure sets, and the duration from which the UE 204 is waiting for the UL grant, as inputs to the learning-based cell database 410a. The learning-based cell database 410a may be maintained for all the serving cells with which the UE 204 frequently establishes the connection. The learning-based cell database 410a may be trained using the training datasets, wherein each training dataset may include the mapping of the parameters of the UE 204 with the typical recovery time. An example training dataset is depicted in FIG. 11.

At operation 1005, the learning-based cell database 410a processes the received inputs from the UE 204 and determines the recovery time/expected duration to receive the UL grant.

At operation 1006, the UE 204 checks if the duration from which the UE 204 is waiting for the UL grant is greater than the determined recovery time.

If the duration from which the UE 204 is waiting for the UL grant is lesser than the determined recovery time, the UE 204 continues to wait for the reception of the UL grant by performing the operations 1001-1005.

If the duration from which the UE 204 is waiting for the UL grant is equal to or greater than the determined recovery time, at operation 1007, the UE 204 sends the SCG failure report to the MN 202a through the MCG signaling. The UE 204 updates the learning-based cell database 410a, on sending the SCG failure report to the MN 202a.

At operation 1008, the UE 204 receives the new NR configuration indicating the new SCG from the MN 202a in the RRC reconfiguration message. The UE 204 adds the new SCG indicated by the MN 202a for reviving the SR resources. The new SCG may be the same SCG, which has been released. Alternatively, the new SCG may be the different Spcell associated with the SCG.

Embodiments herein provide a User Equipment (UE) implementation-based solution to recover a secondary carrier in a Dual Connectivity (DC) scenario, on detecting Scheduling Request (SR) failure (i.e., an issue of Scheduling Request (SR) messages not reaching a Master Node (MN) or a secondary node (SN) through the secondary carrier).

Embodiments herein use a failure of the secondary carrier to revive lost SR resources from the SR failure.

Embodiments herein enable the UE to release the secondary carrier by reporting the failure of the secondary carrier to the MN, on detecting the failure of the SR procedure and receive new Radio Resource Control (RRC) reconfigurations from the MN indicating a new secondary carrier to add for reviving the lost SR resources. Thus, enhancing user experience;

increasing power saving by avoiding excessive signaling and a Random-Access Channel (RACH) procedure in a loop;

avoiding bad user experience such as low throughput, data stalls, and so on, by avoiding the RACH procedure in the loop situation especially in a congestion scenario;

providing uninterrupted service to the user, as the secondary carrier has been recovered on detecting the failure of the SR procedure; and reviving the SR resources with fast recovery time ranging between few milliseconds to a few seconds.

The embodiments disclosed herein may be implemented through at least one software program running on at least one hardware device and performing network management functions to control the elements. The elements shown in FIGS. 2, 3, and 4, may be at least one of a hardware device, or a combination of hardware device and software module.

The embodiments disclosed herein describe methods and systems for reviving Scheduling Request (SR) resources. Therefore, it is understood that the scope of the protection is extended to such a program and in addition to a computer readable storage having a message therein, such computer readable storage contains program code for implementation of one or more operations of a method, when the program runs on a server or mobile device or any suitable programmable device. The method is implemented in a preferred embodiment through or together with a software program written in e.g., Very high speed integrated circuit Hardware Description Language (VHDL) another programming language, or implemented by one or more VHDL or several software modules being executed on at least one hardware device. The hardware device may be any kind of portable device that may be programmed. The device may also include mechanisms which could be e.g., hardware mechanisms like e.g., an application specific integrated circuits (ASIC), or a combination of hardware and software mechanisms, e.g., an ASIC and a field programmable gate array (FPGA), or at least one microprocessor and at least one memory with software modules located therein. The method embodiments described herein could be implemented partly in hardware and partly in software. Alternatively, the invention may be implemented on different hardware devices, e.g., using a plurality of CPUs.

The foregoing description of the specific embodiments will so fully reveal the general nature of the embodiments herein that others may, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless communication system, the method comprising:

receiving, from a first base station (BS), a first radio resource control (RRC) configuration including a first frequency;

requesting the first BS on the first frequency to allocate an uplink (UL) grant for an UL transmission by applying the first RRC configuration;

detecting at least one UL grant failure in which the UE lost scheduling request (SR) resources and did not receive the UL grant from the first BS on the first frequency;

releasing the first frequency by reporting the at least one UL grant failure to a second BS;

in response to the reporting of the at least one UL grant failure, receiving, from the second BS, a second RRC configuration including a second frequency; and adding the second frequency for reviving the lost SR resources.

2. The method of claim 1, wherein the first BS includes a master node (MN) or a secondary node (SN), wherein the second BS includes the MN, wherein the first frequency corresponds to a secondary carrier associated with the SN connected with the MN, and wherein the secondary carrier includes a secondary cell group (SCG).

3. The method of claim 1, wherein the second frequency corresponds to a same first frequency that is released or a different secondary primary cell (Spcell) associated with the first frequency.

4. The method of claim 1, wherein the at least one UL grant failure includes at least one of:

a failure of an SR procedure;

the failure of the SR procedure and a failure of a follow-up random access channel (RACH) procedure;

the failure of the SR procedure with no physical uplink control channel (PUCCH) configurations;

the failure of the SR procedure with a PUCCH UL channel issue; or the failure of the SR procedure with resource congestion.

5. The method of claim 4, wherein detecting the at least one UL grant failure, in case that the at least one UL grant failure is the failure of SR procedure, comprises:

sending an SR message to the first BS on the first frequency recursively until the UL grant for the UL transmission is received or a number of transmissions of SR messages reaches an SR transmission maximum threshold; and based on a number of transmissions of the SR messages reaching the SR transmission maximum threshold and the UE has not received the UL grant from the first BS on the first frequency, detecting the failure of the SR procedure.

6. The method of claim 4, wherein detecting the at least one UL grant failure, in case that the at least one UL grant failure is the failure of the SR procedure and the failure of the follow-up RACH procedure, comprises:

detecting the failure of the SR procedure;

in response to the detecting of the failure of the SR procedure, recursively performing the follow-up RACH procedure with the first BS on the first frequency for a pre-defined number of RACH attempts;

checking whether the UE has received the UL grant from the first BS on the first frequency after performing the follow-up RACH procedure for the pre-defined number of RACH attempts; and based on the checking resulting in identifying that the UE has not received the UL grant after performing the follow-up RACH procedure for the pre-defined number of RACH attempts, detecting the failure of the SR procedure and the follow-up RACH procedure.

7. The method of claim 4, wherein detecting the at least one UL grant failure, in case that the at least one UL grant failure is the failure of the SR procedure with no PUCCH configurations, comprises:

detecting the failure of the SR procedure;

in response to the detecting of the failure of the SR procedure, initiating the follow-up RACH procedure with the first BS on the first frequency to receive the UL grant;

determining a successful follow-up RACH procedure with the first BS on the first frequency;

after determining the successful follow-up RACH procedure, checking whether the UE has received the PUCCH configurations from the first BS on the first frequency; and based on the checking resulting in identifying that the UE has not received the PUCCH configurations after determining the successful follow-up RACH procedure, detecting the failure of the SR procedure with no PUCCH configurations.

8. The method of claim 4, wherein detecting the at least one UL grant failure, in case that the at least one UL grant failure is the failure of the SR procedure with the PUCCH UL channel issue, comprises:

sending an SR message with a hybrid automatic repeat request (HARQ) acknowledgment (ACK) to the first BS on the first frequency recursively until the UL grant for the UL transmission is received or a number of transmissions of the SR messages reaches an SR transmission maximum threshold;

based on the number of transmissions of the SR messages with the HARQ ACK reaches the SR transmission maximum threshold, determining the failure of SR procedure;

in response to determining the failure of the SR procedure for the UL grant request, initiating the follow-up RACH procedure with the first BS on the first frequency to receive the UL grant;

after initiating the follow-up RACH procedure, receiving at least one physical downlink shared channel (PDSCH) packet from the first BS on the first frequency; and in response to the receiving of the at least one PDSCH packet, detecting the failure of the SR procedure with the PUCCH UL channel issue.

9. The method of claim 8, further comprising:

in response to the detecting of the failure of the SR procedure with the PUCCH UL channel issue, aborting the follow-up RACH procedure while the follow-up RACH procedure is ongoing.

10. The method of claim 4, wherein detecting the at least one UL grant failure, in case that the at least one UL grant failure is the failure of the SR procedure with the resource congestion, comprises:

detecting the failure of the SR procedure;

in response to the detecting of the failure of the SR procedure, initiating the follow-up RACH procedure with the first BS on the first frequency to receive the UL grant;

receiving, on a successful follow-up RACH procedure, physical uplink shared channel (PUSCH) allocations from the first BS on the first frequency;

after the receiving of the PUSCH allocations, checking whether the UE has received the UL grant from the first BS;

based on the checking resulting in identifying that the UE has not received the UP grant, determining, using a learning-based cell database, an expected duration within which the first BS starts allocating the UL grant;

determining a duration for which the UE is waiting for the UL grant;

comparing the duration for which the UE is waiting for the UL grant with the expected duration;

based on the duration for which the UE is waiting for the UL grant being lesser than the expected duration, continuing to wait for the UL grant; and based on the duration for which the UE is waiting for the UL grant being equal to or greater than the expected duration, detecting the failure of the SR procedure with the resource congestion, wherein the resource congestion indicates that the first BS does not have resources required for allocating the UL grant to the UE on the first frequency, wherein the learning-based cell database is trained using a mapping of parameters of the UE with a typical recovery time, and wherein the parameters of the UE include at least one of a location, UE date settings, UE time settings, cell identifier, or channel state information.

11. The method of claim 1, wherein the reporting of the at least one UL grant failure to the second BS comprises:

sending a non-RACH message to the second BS on a primary carrier, wherein the non-RACH message includes at least one of a radio link failure (RLF) message, a secondary cell group (SCG) failure report message, or an inactivity and handover failure message, and wherein the primary carrier includes a master cell group (MCG) associated with the second BS.

12. A user equipment (UE) in a wireless communication system, the UE comprising:

a transceiver;

memory storing program codes; and at least one processor coupled to the memory and the transceiver, wherein the program codes, when executed by the at least one processor, clause the UE to:

receive, from a first base station (BS), a first radio resource control (RRC) configuration including a first frequency, request the first BS on the first frequency to allocate an uplink (UL) grant for an UL transmission by applying the first RRC configuration, detect at least one UL grant failure in which the UE lost scheduling request (SR) resources and did not receive the UL grant from the first BS on the first frequency, release the first frequency by reporting the at least one UL grant failure to a second BS, in response to the reporting of the at least one UL grant failure, receive, from the second BS, a second RRC configuration including a second frequency, and add the second frequency for reviving the lost SR resources.

13. The UE of claim 12, wherein the at least one UL grant failure includes at least one of:

a failure of an SR procedure;

the failure of the SR procedure and a failure of a follow-up random access channel (RACH) procedure;

the failure of the SR procedure with no physical uplink control channel (PUCCH) configurations;

the failure of the SR procedure with a PUCCH UL channel issue; or the failure of the SR procedure with resource congestion.

14. The UE of claim 13, wherein, in case that the at least one UL grant failure is the failure of SR procedure, for detecting the at least one UL grant failure, the program codes, when executed by the at least one processor, clause the UE to:

send an SR message to the first BS on the first frequency recursively until the UL grant for the UL transmission is received or a number of transmissions of SR messages reaches an SR transmission maximum threshold; and based on a number of transmissions of the SR messages reaching the SR transmission maximum threshold and the UE has not received the UL grant from the first BS on the first frequency, detect the failure of the SR procedure.

15. The UE of claim 13, wherein, in case that the at least one UL grant failure is the failure of the SR procedure and the failure of the follow-up RACH procedure, for detecting the at least one UL grant failure, the program codes, when executed by the at least one processor, clause the UE to:

detect the failure of the SR procedure;

in response to the detecting of the failure of the SR procedure, recursively perform the follow-up RACH procedure with the first BS on the first frequency for a pre-defined number of RACH attempts;

check whether the UE has received the UL grant from the first BS on the first frequency after performing the follow-up RACH procedure for the pre-defined number of RACH attempts; and based on the checking resulting in identifying that the UE has not received the UL grant after performing the follow-up RACH procedure for the pre-defined number of RACH attempts, detect the failure of the SR procedure and the follow-up RACH procedure.

16. The UE of claim 13, wherein, in case that the at least one UL grant failure is the failure of the SR procedure with no PUCCH configurations, for detecting the at least one UL grant failure, the program codes, when executed by the at least one processor, clause the UE to:

detect the failure of the SR procedure;

in response to the detecting of the failure of the SR procedure, initiate the follow-up RACH procedure with the first BS on the first frequency to receive the UL grant;

determine a successful follow-up RACH procedure with the first BS on the first frequency;

after determining the successful follow-up RACH procedure, check whether the UE has received the PUCCH configurations from the first BS on the first frequency; and based on the checking resulting in identifying that the UE has not received the PUCCH configurations after determining the successful follow-up RACH procedure, detect the failure of the SR procedure with no PUCCH configurations.

17. The UE of claim 13, wherein, in case that the at least one UL grant failure is the failure of the SR procedure with the PUCCH UL channel issue, for detecting the at least one UL grant failure, the program code, when executed by the at least one processor, clause the UE to:

send an SR message with a hybrid automatic repeat request (HARQ) acknowledgment (ACK) to the first BS on the first frequency recursively until the UL grant for the UL transmission is received or a number of transmissions of the SR messages reaches an SR transmission maximum threshold;

based on the number of transmissions of the SR messages with the HARQ ACK reaches the SR transmission maximum threshold, determine the failure of SR procedure;

in response to determining the failure of the SR procedure for the UL grant request, initiate the follow-up RACH procedure with the first BS on the first frequency to receive the UL grant;

after initiating the follow-up RACH procedure, receive at least one physical downlink shared channel (PDSCH) packet from the first BS on the first frequency; and in response to the receiving of the at least one PDSCH packet, detect the failure of the SR procedure with the PUCCH UL channel issue.

18. The UE of claim 13, wherein, in case that the at least one UL grant failure is the failure of the SR procedure with the resource congestion, for detecting the at least one UL grant failure, the program codes, when executed by the at least one processor, clause the UE to:

detect the failure of the SR procedure;

in response to the detecting of the failure of the SR procedure, initiate the follow-up RACH procedure with the first BS on the first frequency to receive the UL grant;

receive, on a successful follow-up RACH procedure, physical uplink shared channel (PUSCH) allocations from the first BS on the first frequency;

after the receiving of the PUSCH allocations, check whether the UE has received the UL grant from the first BS;

based on the checking resulting in identifying that the UE has not received the UP grant, determine, using a learning-based cell database, an expected duration within which the first BS starts allocating the UL grant;

determine a duration for which the UE is waiting for the UL grant;

compare the duration for which the UE is waiting for the UL grant with the expected duration;

based on the duration for which the UE is waiting for the UL grant being lesser than the expected duration, continue to wait for the UL grant; and based on the duration for which the UE is waiting for the UL grant being equal to or greater than the expected duration, detect the failure of the SR procedure with the resource congestion, wherein the resource congestion indicates that the first BS does not have resources required for allocating the UL grant to the UE on the first frequency, wherein the learning-based cell database is trained using a mapping of parameters of the UE with a typical recovery time, and wherein the parameters of the UE include at least one of a location, UE date settings, UE time settings, cell identifier, or channel state information.

* * * * *